United States Patent
Sundar et al.

(12) 
(10) Patent No.: US 12,407,689 B1
(45) Date of Patent: *Sep. 2, 2025

(54) PROCESSING TOKENS IN IDENTITY ASSERTIONS FOR ACCESS CONTROL TO RESOURCES

(71) Applicant: Citicorp Credit Services, Inc. (USA), Jacksonville, FL (US)

(72) Inventors: Gayathri Sundar, Irving, TX (US); Mayank Shah, East Windsor, NJ (US)

(73) Assignee: CITICORP CREDIT SERVICES, INC. (USA), Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,160

(22) Filed: Oct. 30, 2023

Related U.S. Application Data

(63) Continuation of application No. 17/232,628, filed on Apr. 16, 2021, now Pat. No. 11,805,127.

(51) Int. Cl.
*H04L 9/40* (2022.01)

(52) U.S. Cl.
CPC .......... *H04L 63/102* (2013.01); *H04L 63/083* (2013.01); *H04L 63/0884* (2013.01)

(58) Field of Classification Search
CPC . H04L 63/102; H04L 63/083; H04L 63/0884; H04L 9/3226; H04W 12/069
See application file for complete search history.

(56) References Cited

U.S. PATENT DOCUMENTS

| | | | |
|---|---|---|---|
| 8,607,306 B1* | 12/2013 | Bridge | H04L 67/02 726/1 |
| 9,137,131 B1 | 9/2015 | Sarukkai et al. | |
| 9,332,433 B1 | 5/2016 | Dotan et al. | |
| 2005/0108423 A1 | 5/2005 | Centemri | |
| 2006/0230279 A1* | 10/2006 | Morris | H04L 9/321 713/182 |
| 2007/0005765 A1 | 1/2007 | Lamb et al. | |

(Continued)

OTHER PUBLICATIONS

Chaowang Shang et al. "SAML Based Unified Access Control Model for Inter-Platform Educational Resources" (Year: 2008). pp. 909-912.*

(Continued)

*Primary Examiner* — Luu T Pham
*Assistant Examiner* — Canh Le
(74) *Attorney, Agent, or Firm* — Foley & Lardner LLP

(57) ABSTRACT

Presented herein are systems and methods for processing tokens in identity assertions for access control to resources. A server may receive, via an interface from a gateway, a request to permit a customer device to access a resource associated with the server. The request may include an identifier for the customer device and a first token used to authenticate the customer device at the gateway. The server may generate, responsive to validating the first token, a second token to be used to authorize the customer device at the server for access to the resource. The server may store, on a database, an association identifying the identifier, the first token, and the second token. The server may perform the server, an action to permit the customer device access to the resource associated with the server based on the association maintained on the database.

18 Claims, 13 Drawing Sheets

(56) References Cited

U.S. PATENT DOCUMENTS

| | | | |
|---|---|---|---|
| 2012/0284786 A1* | 11/2012 | Somani | H04L 63/0884 |
| | | | 726/5 |
| 2015/0089417 A1* | 3/2015 | Dayan | G06F 3/04817 |
| | | | 715/765 |
| 2016/0205108 A1 | 7/2016 | Si et al. | |
| 2016/0224983 A1 | 8/2016 | Cash | |
| 2017/0099280 A1* | 4/2017 | Goel | H04L 67/146 |
| 2018/0075081 A1 | 3/2018 | Chipman | |
| 2018/0204272 A1* | 7/2018 | Sargeant | H04L 51/063 |
| 2019/0082026 A1 | 3/2019 | Wu et al. | |
| 2020/0136825 A1 | 4/2020 | Gupta et al. | |
| 2021/0117170 A1* | 4/2021 | Zhang | G06F 9/44505 |
| 2021/0144140 A1* | 5/2021 | Murphy | H04L 9/321 |
| 2021/0243281 A1* | 8/2021 | Duan | H04W 88/16 |
| 2022/0027499 A1* | 1/2022 | Watkins | G06F 16/2379 |
| 2022/0030423 A1* | 1/2022 | Sicard | H04W 12/06 |
| 2022/0114547 A1* | 4/2022 | Dumitras | G06Q 20/145 |
| 2022/0329414 A1* | 10/2022 | Gaddam | H04L 63/0807 |
| 2023/0120485 A1* | 4/2023 | Shankar | H04L 9/3213 |
| | | | 713/159 |

OTHER PUBLICATIONS

Hidehito Gomim, "Dynamic Identity Delegation Using Access Tokens in Federated Environments" (Year: 2011), pp. 612-619.*
Dina Hussein et al., "A Community-Driven Access Control Approach in Distributed IoT Environments," 2017, pp. 146-153 (Year: 2017).
Nils Gruschka et al., "Access Control Enforcement for Web Services by Event-Based Security Token Processing," 2017, pp. 1-12 (Year: 2017).

* cited by examiner

PROCESSING TOKENS IN IDENTITY ASSERTIONS FOR ACCESS CONTROL TO RESOURCES

CROSS-REFERENCE TO RELATED APPLICATIONS

This application is a continuation of U.S. patent application Ser. No. 17/232,628, filed Apr. 16, 2021, which is incorporated by reference in its entirety.

TECHNICAL FIELD

This application generally relates to identity assertions. In particular, the present application relates to processing tokens in identity assertions for access control to resources.

BACKGROUND

A user of a customer device may be authenticated to access a service via an identity provider by providing authentication credentials. On behalf of the service, the identity provider may maintain and manage the identity information of the user and may handle the authentication of the customer device to access the service. Once authenticated by the identity provider, the customer device may access the service to perform any number of functions. In this arrangement, however, the service may be heavily reliant on the identity provider properly managing the identity information for all the users of the service as access authentication. The service may thus be vulnerable to unauthorized access and other security risks, if the identity provider were to improperly authenticate an entity. Furthermore, an administrator of the service may lack control in augmenting security policies in addition to those of the identity provider.

SUMMARY

Disclosed herein are systems and methods of processing tokens in identity assertions for controlling access to resources. A service hosting resources may delegate the processing of authentication of customer devices to an identity provider. On behalf of the service, the identity provider can maintain the management of identity information for a user associated with the customer device authorized to access the resources of the service in accordance to various protocols, such as OAUTH2.0, OpenID Connect, and CIBA (Client Initiated Backchannel Authentication), among others. In general, when the customer device sends a request to access the service on behalf of the customer, the customer device may be redirected by the service to the identity provider. The identity provider then validates the authentication credentials against the identity information stored for this customer. If the validation is successful, the identity provider may issue and transmit an indication of success, along with a token to the customer device. The token may be used by the customer device to request access the various resources of the partner service for a limited period of time as defined by the identity provider.

There are many technical shortcomings with the delegation of the processing of authentication to the identity provider, such as for a customer who is acquisitioned through a partner channel. From the perspective of the service, the service lacks the ability to control the authentication process carried out by identity provider. This is because the identity provider and the service may be operated and administered by different entities, and the authentication process by the identity provider may not be visible to the service. As a result, the service may have to wholly rely on the identity provider properly authenticating the customer device and, as a result, indiscriminately accept the token issued by the identity provider. If the identity provider were to improperly authenticate an unauthorized customer via any customer device, the service may be open to security vulnerabilities and the customer device may thus be able to improperly access the resources of the server. Furthermore, should the administrator of the service desire higher levels of security different from the identity provider, the administrator may be unable to do so due to the inability to control and lack of visibility of the authentication process.

To address these and other technical challenges, the service hosting the resource may employ an authorization server separate from the identity provider to manage its own tokens. The authorization server and the service may be associated with the same entity. The entity associated with the authorization service in turn may be a partner entity associated with the identity provider. Once the customer associated with the customer device is successfully authenticated by the identity provider, the customer device is provided with an identity assertion token. As part of the request to access the resource on the partner service, the customer device in turn transmits the identity assertion token to the service via an interface (e.g., defined using an application programming interface (API)). The service in turn directs the identity assertion token to its own authorization server.

Upon receipt, the authorization server may validate the identity assertion token issued by the identity provider. When the identity assertion token is successfully validated, the authorization server may issue its own internal token for the customer and the customer device. The authorization server can map the internal token to the identity assertion token issued by the identity provider and store the mapping on a database. The authorization server may have a policy for managing internal tokens. The policy can, for example, specify a time limit (e.g., up to 30 minutes) during which its own internal token (or by extension the mapping) is valid as well as conditions under which the internal token can be revoked. In addition, the authorization server responds to the service to indicate that the identity assertion token has been successfully processed. The service in turn responds to the customer device to indicate that access to the resources is granted.

Subsequently, each time the same customer and customer device attempts to access the resources of the service, the customer device may send an access request that carries the same identity assertion token to the service via the interface. The identity assertion token may have been received from the identity provider. The service, again in turn, can redirect the request to the authorization service. Upon receipt, the authorization server can check whether there is a mapping of the received identity assertion token with a previously issued internal token. If no mapping exists or the internal token is invalid under the policy specifications, the authorization server may not validate the internal token. The authorization server may attempt to validate the identity assertion token separately, and repeat the process as discussed above. On the other hand, if such a mapping exists and the internal token is still valid under its policy specifications, the authorization server can validate the identity assertion token. The authorization server responds to the service to indicate that the identity assertion token has been successfully processed, and the service in turn responds to the customer device to indicate that access to the resources is granted.

By handling identity assertion tokens in this manner, the authorization server may apply security policies separate from those of the identity provider, even without visibility to or control of the authentication process carried out by the identity provider. With the additional checks of identity assertion tokens by the authorization server, the service no longer has to wholly rely on the identity provider for proper authentication of customer devices to grant access to the resources. In addition, the likelihood of improper, unauthorized access of the resources of the service is alleviated and reduced, thereby improving the overall security of the network environment.

Aspects of present disclosure are directed to systems, methods, and non-transitory computer readable media for processing tokens in identity assertions for controlling access to resources. A server may receive, via an interface from a gateway, a request to permit a customer device to access a resource associated with the server. The request may include an identifier for the customer identifier for the customer device and a first token used to authenticate the customer device at the gateway. The server may generate, responsive to validating the first token, a second token to be used to authorize the customer device at the server for access to the resource. The server may store, on a database, an association identifying the identifier for the customer device, the first token used by the gateway, and the second token to be used by the server to authorize the customer device. The server may perform the server, an action to permit the customer device access to the resource associated with the server based on the association maintained on the database.

In some embodiments, the server may receive, via the interface from the gateway, subsequent to performing the action, a second request to permit the customer device to access the resource associated with the server. The second request may include the identifier and the first token. In some embodiments, the server may identify the second token as associated with the first token in accordance with the association maintained on the database and the identifier for the customer device. In some embodiments, the server may perform a second action to permit the customer device access to the resource associated with the server using the second token.

In some embodiments, the server may receive, via the interface from the gateway, subsequent to performing the action, a second request to permit the customer device to access the resource associated with the server. The second request may include the identifier and a third token used to authenticate the customer device at the gateway. In some embodiments, the server may determine, responsive to validating the third token, that a fourth token is to be generated to replace the second token to authorize the customer device at the server for access to the resource.

In some embodiments, the server may receive, via the interface from the gateway, a second request to permit the customer device to access the resource associated with the server. The second request may include the identifier and a third token used to authenticate the customer device at the gateway. In some embodiments, the server may restrict, responsive to failure to validate the third token, generation of a fourth token to be used to authorize the customer device at the server for access to the resource.

In some embodiments, the server may receive, via the interface from a second gateway, a second request to permit the customer device to access the resource associated with the server. The second request may include the identifier and a third token used to authenticate the customer device at the second gateway. In some embodiments, the server may identify the second gateway from which the request is received as not any of a plurality of authorized gateways permitted at the server. In some embodiments, the server may restrict, responsive to identify the second gateway as not any of the plurality of authorized gateways, a generation of a fourth token to be used to authorize the customer device at the server for access of the resource In some embodiments, the server may identify the gateway from which the request is received as one of a plurality of authorized gateways permitted at the server. In some embodiments, the server may generate the second token in response to identifying the gateway as one of the plurality of authorized gateways. In some embodiments, the server may determine that a time elapsed since generation of the second token is greater than a live time limit. In some embodiments, the server may remove responsive to determining the elapsed time is greater than the live time limit, the association identifying the identifier for the customer device, the first token, and the second token from the database.

In some embodiments, the server may maintain the association identifying the identifier for the customer device, the first token, and the second token in accordance with a token management policy. The token management policy may identify a condition under which the second token is maintained on or removed from the database. In some embodiments, the server may receive an invocation of the interface to execute an identity assertion for authorizing the customer device to access the resource at the server, the identity assertion including the identifier and the first token. In some embodiments, the server may transmit, to the gateway, a response indicating that the customer device is permitted to access the resource associated with the server.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and together with the specification, explain the subject matter of the disclosure.

DETAILED DESCRIPTION

Figure 1:
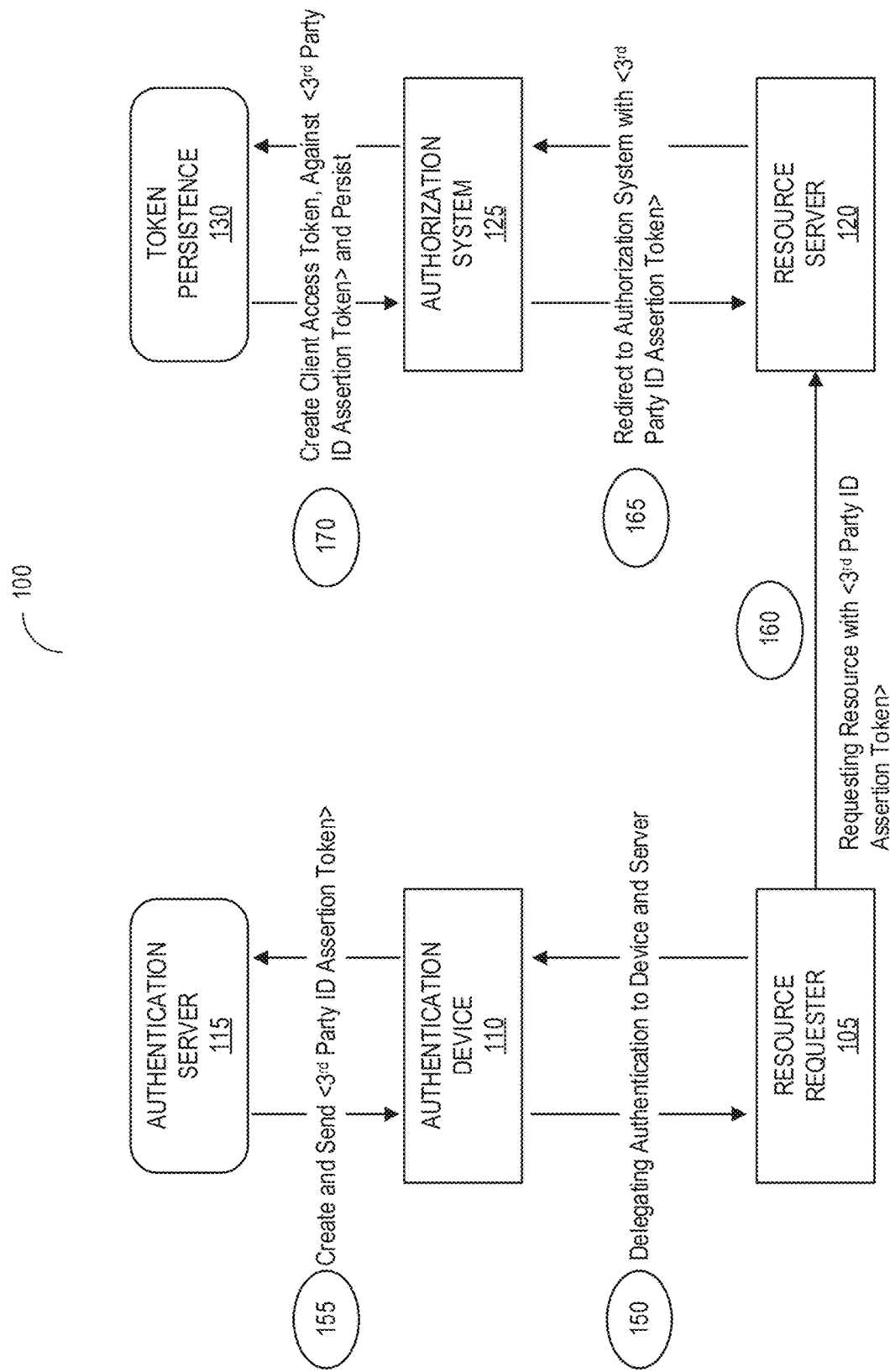
FIG. 1 illustrates an interaction diagram of an example environment for routing access requests and processing identity assertion tokens in accordance with an illustrative embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

The present disclosure is directed to systems and methods of processing tokens in identity assertions for access control of resources. A service hosting the resource may employ an authorization server separate from the identity provider to manage tokens. The authorization server and the service may be associated with the same entity. The entity associated with the authorization service in turn may be a partner entity associated with the identity provider. Once a customer device is successfully authenticated by the identity provider, an identity assertion token issued by the identity provider can be provided to the authorization server by the customer device. The authorization service in turn can validate the identity assertion token, and can issue a separate internal token. The authorization server can map the internal token to the identity assertion token issued by the identity provider and maintain the mapping on a database. Subsequent requests carrying the identity assertion token from the customer device can be checked against the mapping. By handling identity assertion tokens in this manner, the authorization server may apply security policies separate from those of the identity provider.

FIG. 1 depicts an interaction diagram of a system or an environment 100 of routing access requests and processing an identity assertion token. The environment 100 may include a resource requester 105 (sometimes generally referred to as a customer device), an authentication device 110, an authentication server 115 (sometimes herein referred to as an identity provider or an authentication gateway), a resource server 120, an authorization system 125 (sometimes herein referred to as an authorization server), a token persistence database 130, among others. The authentication device 110 and the authentication server 115 may be operated by or otherwise associated with a partner identity provider. The resource server 120 and the authorization system 125 may be operated by or otherwise associated with a resource provider or application host. The resource requester 105 may be an end-user attempting to access the resources of the application host. For example, the application host may be a service provided by a banking institution and the end-user may be a customer attempting to access an account maintained by the banking institution via the service.

Embodiments may comprise additional or alternative components or omit certain components from those of FIG. 1 and still fall within the scope of this disclosure. For example, the authentication device 110 and the authentication server 115 may be part of the same device. Various hardware and software components of one or more public or private networks may interconnect the various components of the environment 100. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The various components of the environment 100 may perform operations 150-170. In operation 150, when the resource requester 105 requests to access the resource server 120, the authentication of the resource requester 105 with the resource server 120 may have been delegated to the authentication device 110 and the authentication server 115. In operation 155, the authentication server 115 creates a third-party identity assertion token and sends the identity assertion token via the authentication device 110 to direct the resource requester 105. The token may identify or include, for example, a client identification code for the end-user of the resource requester 105, a time of authentication by the authentication server 115, and a unique device identifier for the resource requester 105 used by the authentication server 115, among others. In some embodiments, the fields of the identity assertion token can be packaged in formats, such as a JavaScript Object Notation (JSON) object, a JSON web token (JWT), a signed JSON object, a signed and encrypted JSON object (JWE), and encoded string with appropriate delimiters, among others.

Continuing on, in operation 160, the authentication server 115 on behalf of the resource requester 105 may make a resource assess request carrying the third-party identity assertion token to the resource server 120 via an interface (e.g., an application programming interface (API)). At operation 165, the resource server 120 redirects the authentication server 115 to the authorization system 125. The authorization system 125 can consume the third-party identity assertion token issued by the authentication server 115 and validate the identity assertion token (e.g., using a public key exchanged out-of-band).

In operation 170, upon successful validation of the identity assertion token, the authorization system 125 creates a client access token and maps the client-access token against the third-party identity assertion token, along with other parameters. The client-access token may be sent back to the resource requester 105 and maintained internally. With the creation, the authorization system 125 stores and maintains the client-access token on the token persistence database 130. The authorization system 125 can exercise control over the third-party identity assertion token via the mapping using a policy. The policy may specify, for example, a time-to-live for the identity assertion token for accessing the resource server 120 and revocation rules for the identity assertion token and the client-access token.

Subsequently, when the resource requester 105 requests to access the resource server 120 via the interface, such requests also can carry the same third-party identity assertion token previously issued by the authentication server 115. Upon receipt, the authorization system 125 may retrieve the client-access token associated with the identity assertion token. Upon retrieval, the authorization system 125 can validate the claims of the identity assertion and enforce access control with respect to the resource requester 105 and the resource server 120 via the interface.

Figure 2:
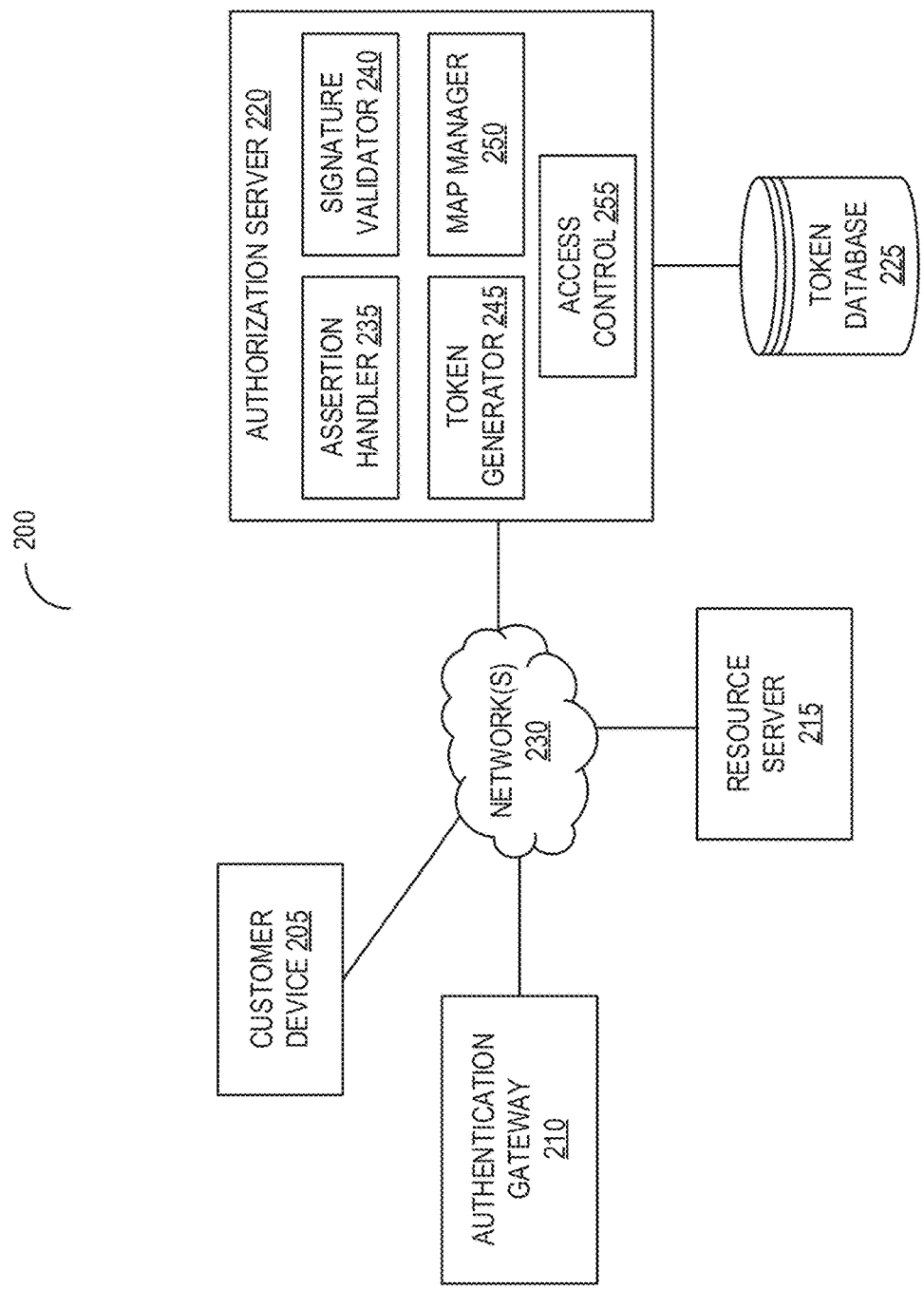
FIG. 2 illustrates a block diagram of an example system for processing tokens in identity assertions for access control to resources in accordance with an illustrative embodiment.

FIG. 2 depicts a block diagram of a system 200 for processing tokens for identity assertions for access control to resources. The system 200 may include a customer device 205 (sometimes also referred herein as a resource requester, a client device, a customer client device, or a customer), an authentication gateway 210 (sometimes also referred herein as an identity provider or an authentication system), a resource server 215, an authorization server 220 (sometimes also referred herein as an authorization system), a token database 225 (sometimes also referred herein as a token persistence database), and one or more network(s) 230, among others. The authorization server 220 may include an assertion handler 235, a signature validator 240, a token generator 245, a map manager 250, and an access controller 255, among others. Embodiments may comprise additional or alternative components or omit certain components from those of FIG. 2, and still fall within the scope of this disclosure. For example, the resource server 215 and the authorization server 220 may be part of the same device.

Various hardware and software components of one or more public or private networks 230 may interconnect the various components of the system 200. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The customer device 205 may be any computing device comprising one or more processors coupled with memory and software, and capable of performing the various processes and tasks described herein. The customer device 205 may be in communication with the authentication gateway 210, the resource server 215, and the authorization server 220 via the network 230. The customer device 205 may be operated by an end-user (sometimes herein referred to as a customer) that is to access the resource server 215 via the authentication gateway 210 and the authorization server 220. In some embodiments, communications from the customer device 205 may be redirected via the network 230 from one component to another. For example, a request to access the resource server 215 may be first redirected to the authentication gateway 210 and then to the authorization server 220. Upon authentication by the authentication gateway 210 and authorization by the authorization server 220, the customer device 205 can establish a communication session with the resource server 215.

The authentication gateway 210 may be any computing device comprising one or more processors coupled with memory and software and capable of performing the various processes and tasks described herein. The authentication gateway 210 may be in communication with the customer device 205, the resource server 215, and the authorization server 220 via the network 230. Although shown as a single authentication gateway 210, the authentication gateway 210 may include any number of computing devices. The authentication gateway 210 may perform an initial authentication of the customer device 205 in accessing the resource server 215 when the request from the customer device 205 is redirected to the authentication gateway 210. From the initial authentication, the authentication gateway 210 may generate and issue an identity assertion token for the customer device 205.

The resource server 215 may be any computing device comprising one or more processors coupled with memory and software and capable of performing the various processes and tasks described herein. The resource server 215 may be in communication with the customer device 205, the authentication gateway 210, and the authorization server 220 via the network 230. Although shown as a single resource server 215, the resource server 215 may include any number of computing devices. The resource server 215 may host, maintain, or otherwise include a resource. The resource may include an application, programs, processes, files, or data, among others. Access to the resource maintained by the resource server 215 may be controlled by the authentication gateway 210 and the authorization server 220.

The authorization server 220 may be any computing device comprising one or more processors coupled with memory and software, and capable of performing the various processes and tasks described herein. The authorization server 220 may be in communication with the customer device 205 (e.g., via the authentication gateway 210), the authentication gateway 210, or the resource server 215 via the network 230, as well as the token database 225. Although shown as a single authorization server 220, the authorization server 220 may include any number of computing devices. The authorization server 220 may validate the identity assertion token generated by the authentication gateway 210 on behalf of the customer device 205. When successfully validated, the authorization server 220 may generate a client-access token, may map the identity assertion token with the client-access token, and store the mapping onto the token database 225. The client-access token may be used to further control access by the customer device 205.

Figure 3:
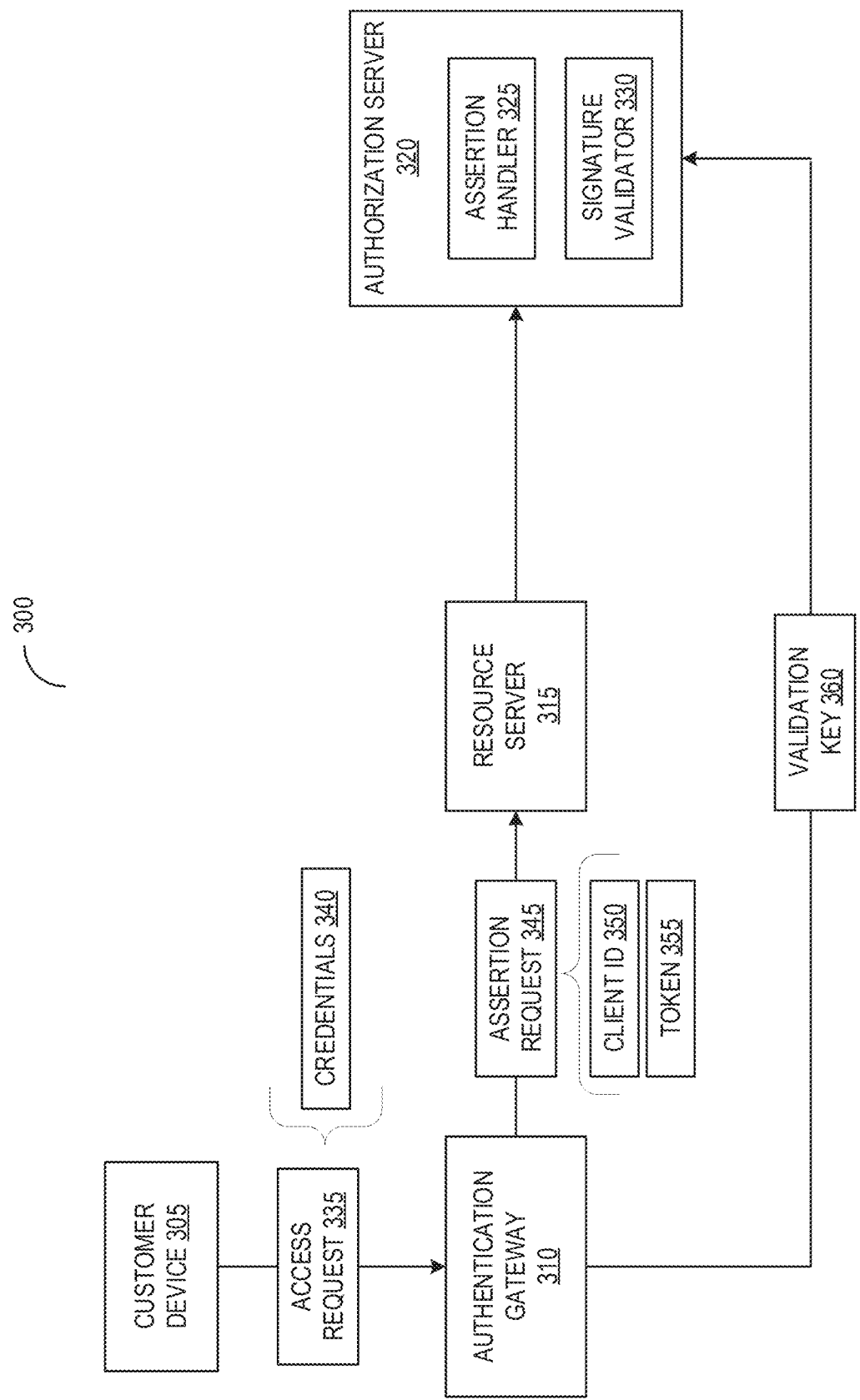
FIG. 3 illustrates a block diagram of an example system for handling initial requests in accordance with an illustrative embodiment.

FIG. 3, depicts a block diagram of a system 300 for handling initial requests. The system 300 may include a customer device 305 (sometimes also referred herein as a resource requester), an authentication gateway 310 (sometimes also referred herein as an identity provider or an authentication system), a resource server 315, and an authorization server 320 (sometimes also referred herein as an authorization system), among others. The authorization server 320 may include an assertion handler 325 and a signature validator 330, among others. Embodiments may comprise additional or alternative components or omit certain components from those of FIG. 3 and still fall within the scope of this disclosure. Various hardware and software components of one or more public or private networks may interconnect the various components of the system 300. Each component in system 300 (such as the customer device 305, the authentication gateway 310, the resource server 315, and the authorization server 320) may be any computing device comprising one or more processors coupled with memory and software and capable of performing the various processes and tasks described herein.

The customer device 305 sends or transmits an access request 335 to permit the customer device 305 to access the resource server 315. The access request 335 may identify or include authentication credentials 340. The authentication credentials 340 may, for example, include a customer identifier (sometimes referred herein as an account identifier) and an authentication factor (e.g., password, location, or possession). The customer identifier may reference, correspond to, or identify the end-user of the customer device 305 or the customer device 305 itself and may be used between the customer device 305 and the authentication gateway 310. In some embodiments, the access request 335 may also identify or include authentication credentials (e.g., password or authentication factor). The access request 335 may be sent by the customer device 305 to the authentication gateway 310. In some embodiments, the access request 335 may be sent directly to the authentication gateway 310 (e.g., as depicted). In some embodiments, the access request 335 may be sent to the resource server 315 and then be redirected by the resource server 315 to the authentication gateway 310.

The authentication gateway 310 retrieves, identifies, or receives the access request 335 from the customer device 305. Upon receipt, the authentication gateway 310 may parse the access request 335 to extract or identify the credentials 340 therefrom. Based on the access request 335, the authentication gateway 310 may determine whether to authenticate the customer device 305 (and by extension the end-user associated with the customer device 305). In this determination, the authentication gateway 310 may compare the authentication credentials 340 identified from the access request 335 with the authentication credentials stored for the end-user associated with the customer device 305 maintained by the authentication gateway 310. When the authentication credentials 340 do not match, the authentication gateway 310 determines to not authenticate the end-user associated with the customer device 305 and may provide a response indicating failure to authenticate. In contrast, when the authentication credentials match, the authentication gateway 310 determines to authenticate the customer device 305.

When the end-user associated with the customer device 305 is successfully authenticated, the authentication gateway 310 may further generate an assertion request 345 (sometimes herein referred to as an identity assertion). The assertion request 345 may indicate that the end-user associated with the customer device 305 has been authenticated at the authentication gateway 310 and may also permit the customer device 305 to access to the resource server 315. The assertion request 345 may identify or include a client identifier 350 and a token 355 (sometimes herein referred to as an identity assertion token). The client identifier 350 may correspond to, reference, or otherwise identify the end-user associated with the customer device 305. The token 355 may indicate that the end-user associated with the customer device 305 has been authenticated at the authentication gateway 310. In some embodiments, the assertion request 345 may include additional information, such as a time at which the end-user associated with the customer device 305 is successfully authenticated at the authentication gateway 310 and a unique request identifier corresponding to the access request 335 or the assertion request 345 itself. In some embodiments, the assertion request 345 may identify or include a token live time (also referred herein as a time-to-live duration). The token live time may define a span of time when the assertion request 345 or the token 355 is deemed valid. The token live time, for example, may be set to a prefixed amount of time subsequent to the successful authentication of the end-user. In some embodiments, the assertion request 345 may include an issuer identifier corresponding to the authentication gateway 310.

In generating the assertion request 345, the authentication gateway 310 may determine or generate the client identifier 350. In some embodiments, the client identifier 350 may be generated by the authentication gateway 310 and may be different from the customer identifier in the credentials 340 (e.g., to anonymize the customer device 305 and the associated end-user). In some embodiments, the client identifier 350 may be the same as the customer identifier of the credentials 340 and obtained from the access request 335. In addition, the authentication gateway 310 may determine or generate the token 355. To generate, the authentication gateway 310 may encrypt the customer identifier associated with the end-user of the customer device 305 and use the encrypted customer identifier as the token 355. In some embodiments, the authentication gateway 310 may generate the token 355 by encrypting at least a portion of content (e.g., a nonce or the client identifier 350) of the assertion request 345. The encryption may include, for example, an asymmetric cryptography, symmetric cryptography, or a cipher, among other. In some embodiments, the authentication gateway 310 may send or transmit a cryptographic key as a validation key 360 to the authentication server 320. For example, the authentication gateway 310 may use a private key of the asymmetric cryptography to generate the tokens at the authentication gateway 310 and may provide the counterpart public key as the validation key 360 to the authorization server 320.

Upon generation, the authentication gateway 310 sends or transmit the assertion request 345 to the authorization server 320. In some embodiments, the assertion request 345 may be sent directly to the authorization server 320. In some embodiments, the assertion request 345 may be sent to the resource server 315 and then may be redirected to the authorization server 320. In some embodiments, the assertion request 345 may be sent to the customer device 305 and then may be redirected to the authorization server 320. Separate from the assertion request 345, the authentication server 320 may send or transmit the validation key 360 to the authorization server 320. In some embodiments, the authentication gateway 310 may send the assertion request 345 by invoking an interface (e.g., application programming interface (API)) of the authorization server 320. The interface may define communications (including the assertion request 435) between the authentication gateway 310 and the authorization server 320. In some embodiments, the invocation of the interface may correspond to an identity assertion request that identifies the client identifier 350 and a token 355.

The resource server 315 may host, maintain, or otherwise include a resource. The resource may include an application, program, process, file, or data, among others. Access to the resource of the resource server 315 by the customer device 305 may be dependent on the successful authentication of the access request 335 by the authentication gateway 310 and the successful authorization of the assertion request 345 by the authorization server 320. In some embodiments, to facilitate the authentication, the resource server 315 may forward or redirect the access request 335 from the customer device 305 upon receipt. Furthermore, the resource server 315 may forward or redirect the assertion request 345 from the authentication gateway 310 to the authorization server 320 for further processing.

The assertion handler 325 executing on the authorization server 320 retrieves, identifies, or otherwise receives the assertion request 345 from the authentication gateway 310. With the receipt, the assertion handler 325 may parse the assertion request 345 to extract or identify the contents therein, such as the client identifier 350 and the token 355. The assertion handler 325 (in conjunction with the signature validator 330) may determine whether to validate the token 355. In some embodiments, the assertion handler 325 may identify the authentication gateway 310 from which the assertion request 345 is received. Upon identification, the assertion handler 325 may identify or determine whether the authentication gateway 310 is one of a trusted list of authentication gateways (also referred herein as a list of trusted issuers). The list may define or identify authentication gateways (sometimes referred to as partner authentication servers or gateways) whose assertion requests are to be trusted for further processing at the authorization server 320. In some embodiments, the list may include a set of issuer identifiers corresponding to the trusted authentication gateways.

The assertion handler 325 may determine whether the authentication gateway 310 matches any on the list of trusted authentication gateways. In some embodiments, the assertion handler 325 may use the issuer identifier included in the assertion request 345 to perform the determination. If the issuer identifier of the assertion request 345 matches one of the list, the assertion handler 325 may determine that the authentication gateway 310 is one of the trusted list. Otherwise, if the issuer identifier of the assertion request 345 does not match any on the list, the assertion handler 325 may determine that the authentication gateway 310 is not any of the trusted set. When the authentication gateway 310 is determined to be not any of the trusted set, the assertion handler 325 may terminate further processing of the assertion handler 325 at the authorization server 320. In terminating, the assertion handler 325 may restrict access of the customer device 305 to the resource server 315. In some embodiments, the assertion handler 325 may also determine that the token 355 is not valid. In some embodiments, the assertion handler 325 may send or transmit an indication of failure to authenticate to the customer device 305, the authentication gateway 310, or the resource server 315. When the authentication gateway 310 is determined to be one of the trusted set, the assertion handler 325 may allow for further processing of the assertion handler 325 at the authorization server 320. In some embodiments, the assertion handler 325 may also determine that the token 355 is valid.

In some embodiments, the assertion handler 325 may the assertion handler 325 may determine whether the token 355 based on the token live time as identified in the assertion request 345. The determination based on the token live time may be performed when the authentication gateway 310 is determined to one of the trusted set or may be performed independent of the determination. In determining the assertion handler 325 may identify a present time (e.g., time of receipt of the assertion request 345) and the token live time. When the present time is outside the token live time, the assertion handler 325 may determine that the token 355 (and the assertion request 345) is not valid. In addition, the assertion handler 325 may terminate further processing of the assertion handler 325 at the authorization server 320. Conversely, when the present time is within the token live time, the assertion handler 325 may allow for further processing of the assertion handler 325 at the authorization server 320. In some embodiments, the assertion handler 325 may determine that the token 355 (and the assertion request 345) is valid.

The signature validator 330 executing on the authorization server 320 may validate the token 355 of the assertion request 345. In some embodiments, the validation of the token 355 may be responsive to determining that the authentication gateway 310 is determined to be of the trusted set and that the token 355 is still valid based on the token live time. In some embodiments, the validation of the token 355 may be responsive to receipt of the assertion request 345. In validating, the signature validator 330 may use the validation key 360 to determine whether token 355 is valid. As discussed above, the validation key 360 (or a companion key) may have been used in the generation of the token 355 in the assertion request 345. The signature validator 330 may apply decryption to the token 355 in accordance with the validation key 360 to generate a resultant. In conjunction, the signature validator 330 may extract or identify at least a portion from the contents (e.g., a nonce or the client identifier 350) of the assertion request 345. The portion may correspond to the portion that was used to generate the token 355 at the authentication gateway 310. With the identification, the signature validator 330 may compare the resultant from the decryption of the token 355 versus the portion from the assertion request 345.

When there is no match, the signature validator 330 may determine that the token 355 is invalid. The signature validator 330 may also terminate further processing (e.g., generation of an internal token at the authorization server 320) of the assertion handler 325 at the authorization server 320. In terminating, the assertion handler 325 may restrict access of the customer device 305 to the resource server 315. In some embodiments, the assertion handler 325 may send or transmit an indication of failure to authenticate to the customer device 305, the authentication gateway 310, or the resource server 315. When there is a match between the resultant and the portion, the signature validator 330 may determine that the token 355 is valid. The signature validator 330 may also allow for further processing of the assertion handler 325 at the authorization server 320.

Figure 4:
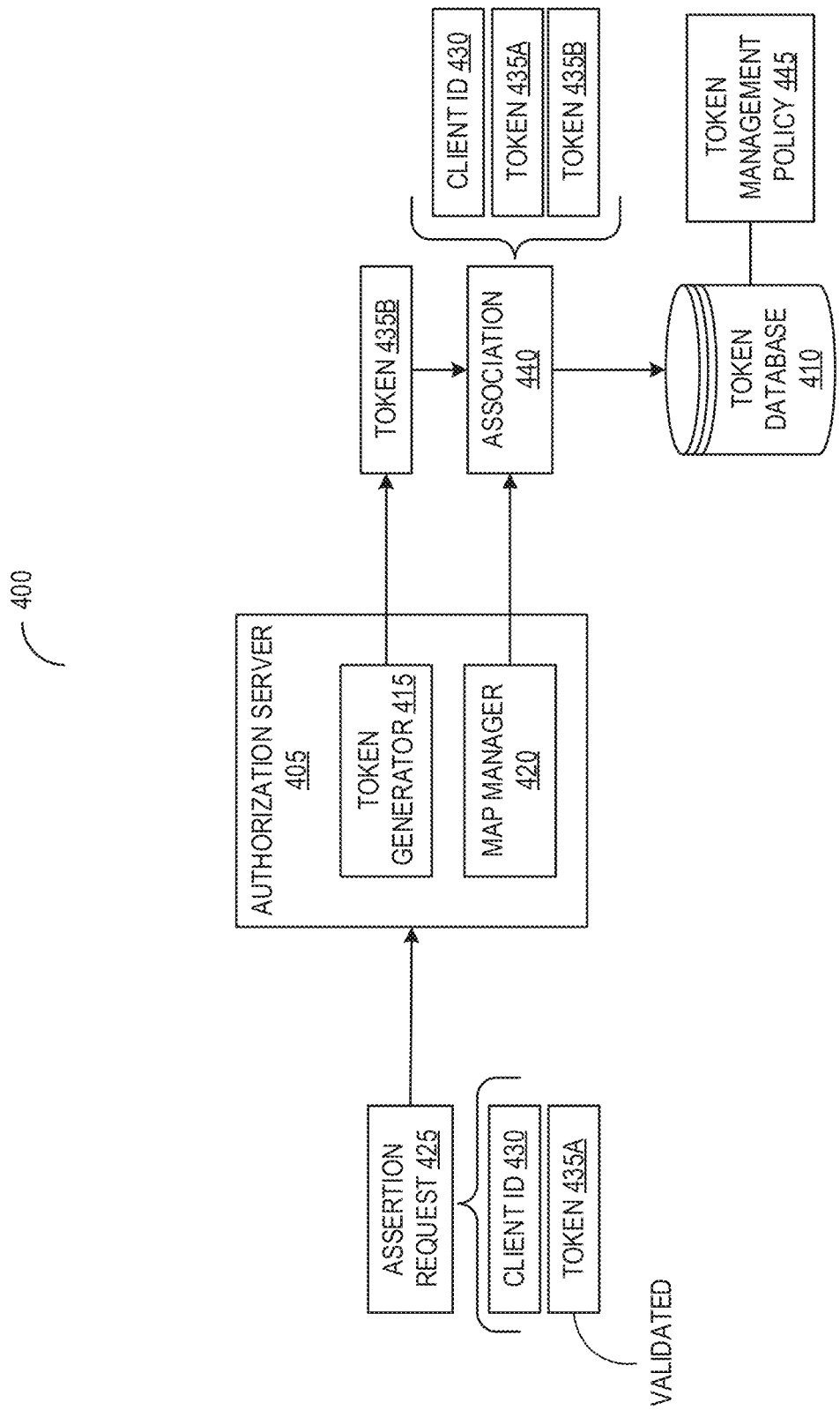
FIG. 4 illustrates a block diagram of an example system for token mapping in accordance with an illustrative embodiment.

FIG. 4 depicts a block diagram of a system 400 for token mapping. The system 400 may include an authorization server 405 (sometimes also referred herein as an authorization system) and a token database 410, among others. The authorization server 405 may include a token generator 415 and a map manager 420, among others. Embodiments may comprise additional or alternative components or omit certain components from those of FIG. 4 and still fall within the scope of this disclosure. Various hardware and software components of one or more public or private networks may interconnect the various components of the system 400. Each component in system 400 (such as the authorization server 405) may be any computing device comprising one or more processors coupled with memory and software and capable of performing the various processes and tasks described herein.

The token generator 415 executing on the authorization server 405 generates a token 435B (sometimes referred herein as a client-access token or an internal token). In some embodiments, the token generator 415 may determine whether to generate the token 435B. To determine, the token generator 415 may access the token database 410 to determine whether a token 435B was generated for the client identifier 430 (or the token 435A). The token database 410 may or may not have a token 435B already generated for the using the client identifier 430 or the token 435A. The assertion request 425 may be a first-time request for the customer device associated with the client identifier 430. As such, no token may have been previously generated for the client identifier 430 (or the token 435A). If no token is determined to be found for the client identifier 430, the token generator 415 may generate the token 435B.

The generation of the token 435B is performed in response to a receipt of an assertion request 425 including a client identifier 430, a token 435A, and a success validation of the token 435A in the assertion request 425. The token 435B may also indicate the customer device is authorized to access the resource server. The token 435B may be used to authorize a customer device identified by the client identifier 430 at the authorization server 405 for access to a resource server. In some embodiments, the generation of the token 435B may be in further response to identifying an authentication gateway from which the assertion request 425 originates as one of a trusted list of authentication gateways. On the other hand, the token generator 415 may restrict the generation of the token 435B in response to a failure to validate the token 435A in the assertion request 425. In some embodiments, the token generator 415 may restrict the generation of the token 435 when an authentication gateway from which the assertion request 425 originates is identified as not one of the trusted list of authentication gateways.

To generate the token 435B, the token generator 415 may identify at least a portion of content (e.g., a nonce or the client identifier 430) in the assertion request 425. The portion identified for the generation of the token 435B may differ from the portion identified for the generation of the token 435A. With the identification, the token generator 415 may encrypt the identified portion to generate the token 435B. The encryption may include, for example, an asymmetric cryptography, symmetric cryptography, or a cipher, among other. In some embodiments, the encryption applied by the token generator 415 to generate the token 435B may differ from the encryption applied in generating the token 435A. For example, an encryption key used to generate the token 435B may differ from an encryption key to generate the token 435A. As a result, the token 435A in the assertion request 425 may differ from the token 435B generated on the authorization server 405.

The map manager 420 executing on the authorization server 405 generates or determines an association 440 (sometimes herein referred to as a mapping). In some embodiments, the map manager 420 may determine whether an association 440 exists for the token 435A. The determination may be in response to the validation of the token 435A. To determine, the map manager 420 may access the token database 410 to find the association 440 using the client identifier 430 or the token 435A. As the assertion request 425 may be derived from the initial access request, the token database 410 may not have any associations 440 for the token 435A of the assertion request 425. Upon determining that no association exists for the token 435A, the map manager 420 may proceed to generate or determine the association 440. The association 440 may be determined in response to the validation of the token 435A in the assertion request 425 and the generation of the token 435B at the authorization server 405. In some embodiments, the association 440 may be determined when an assertion request 425 with the client identifier 430 or the token 435A is received by the authorization server 405 for the first time.

The association 440 may include or identify the client identifier 430, the token 435A from the assertion request 425, and the token 435B generated at the authorization server 405. In some embodiments, in determining the association 440, the map manager 420 may identify the token 435B generated at the authorization server 405 as associated with the token 435A from the assertion request 425. The map manager 420 may further identify the client identifier 430 as associated with the token 435B from the assertion request 425. Using the identifications of the client identifier 430, the token 435A, and the token 435B, the map manager 420 may determine the association 440.

With the determination, the map manager 420 stores and maintains the association 440 on the token database 410. In some embodiments, stored on the token database 410, the association 440 and the token 435B may not be accessible to devices or servers other than the authorization server 405. As such, the token 435B may be used internally by the authorization server 405 to enforce policies in relation to the accessing of the resource server. In some embodiments, the map manager 420 may maintain the association 440 (or the token 435B) on the token database 410 in accordance with a token management policy 445.

The token management policy 445 may specify or define one or more rules (or conditions) under which the association 440 (or the token 435B) is to be maintained or revoked. In some embodiments, the token management policy 445 may specify a time limit (e.g., up to 15 minutes to an hour) up to which the association 440 or the token 435B is valid. In some embodiments, the token management policy 445 may specify a revocation condition under which the association 440 or the token 435B is to become invalid. For example, the revocation condition may specify that the token 435B is to become invalid at the end of each day. In some embodiments, the token management policy 445 may specify a keep-alive condition under which the validity of the association 440 or the token 435B is to be maintained. For example, the keep-alive condition may specify that the validity of the token 435B should be maintained throughout the duration of a session between the associated customer device and the resource server accessed by the customer device.

By applying the token management policy 445, the map manager 420 may handle the tokens 435B and associations 440 on the token database 410. For each token 435B (or association 440), the map manager 420 may determine whether the token 435B is in compliance with the token management policy 445. In some embodiments, the map manager 420 may maintain a time elapsed since the generation of the token 435B. The map manager 420 may compare the elapsed time to the time limit as specified by the token management policy 445. When the elapsed time is greater than the time limit, the map manager 420 may remove or disable the token 435B (or the association 440). Otherwise, the map manager 420 may maintain the token 435B (and the association 440). In some embodiments, the map manager 420 may identify a condition associated with the token 435B or the association 440. The condition may include, for example, time of day, an existence of a session between the resource server and the customer device referenced by the client identifier 430, among others. With the identification, the map manager 420 may compare the condition to the revocation condition or the keep-alive condition. When the identified condition matches the revocation condition, the map manager 420 may remove or disable the token 435B (or the association 440). Conversely, when the identified condition matches the keep-alive condition, the map manager 420 may maintain the token 435B (and the association 440).

Figure 5:
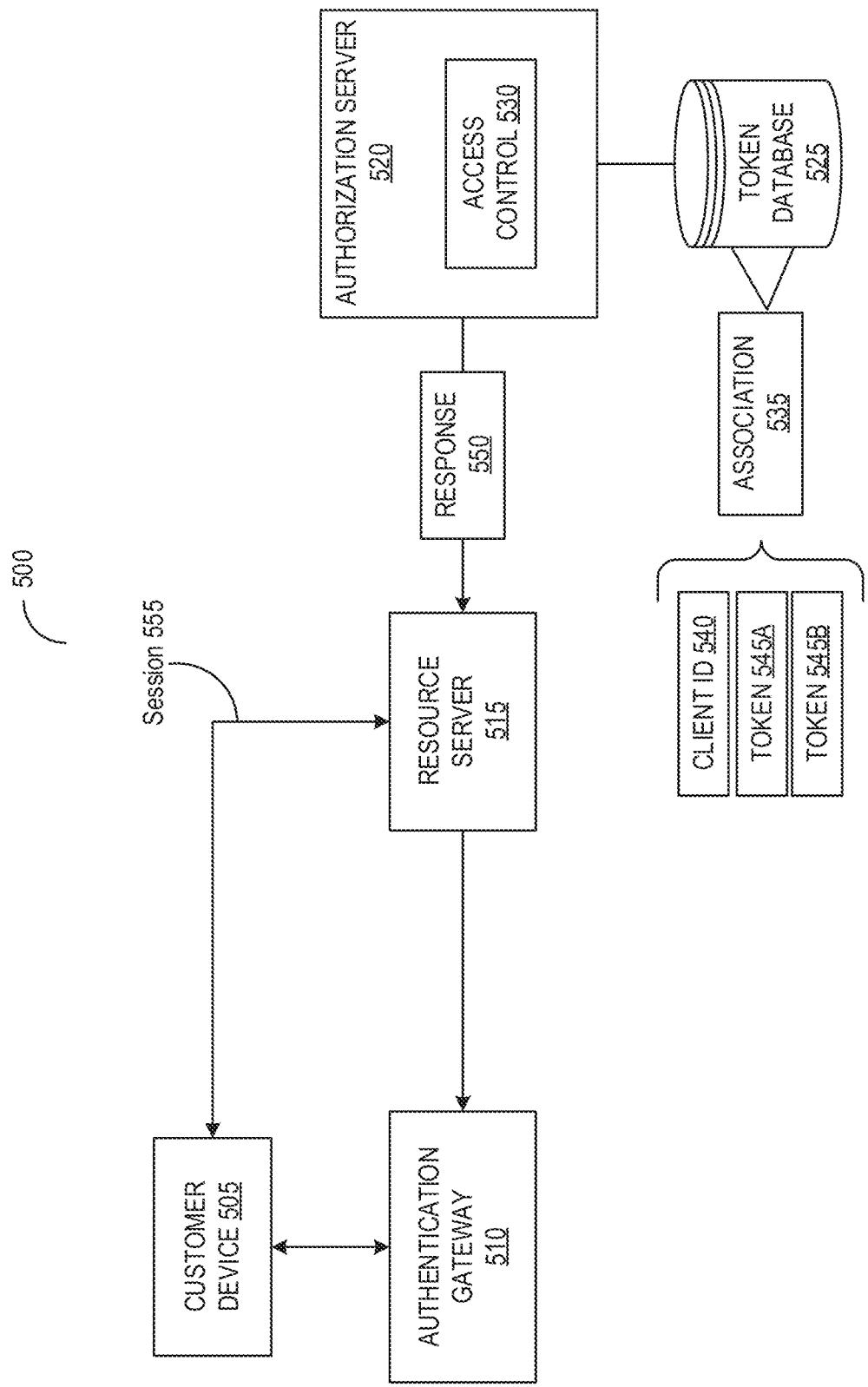
FIG. 5 illustrates a block diagram of an example system for policy enforcement in processing tokens in accordance with an illustrative embodiment.

FIG. 5 depicts a block diagram of a system 500 for policy enforcement in processing tokens. The system 500 may include a customer from a specific customer device 505 (sometimes also referred herein as a resource requester), an authentication gateway 510 (sometimes also referred herein as an identity provider or an authentication system), a resource server 515, an authorization server 520 (sometimes also referred herein as an authorization system), and a token database 525, among others. The authorization server 520 may include an access controller 530, among others. Embodiments may comprise additional or alternative components or omit certain components from those of FIG. 5 and still fall within the scope of this disclosure. Various hardware and software components of one or more public or private networks may interconnect the various components of the system 500. Each component in system 500 (such as the customer device 505, the authentication gateway 510, the resource server 515, and the authorization server 520) may be any computing device comprising one or more processors coupled with memory and software, and capable of performing the various processes and tasks described herein.

The access controller 530 executing on the authorization server 520 performs an action in accordance with the association 535 maintained on the token database 525. The action may be performed to permit the end-user associated with customer device 505 to access the resource server 515. The association 535 may include or identify a client identifier 540 corresponding to the end-user associated with customer device 505, a token 545A generated by the authentication gateway 510, and the token 545B generated at the authorization server 520. When the association 535 is determined for the first assertion request, the access controller 530 may determine that the end-user associated with the customer device 505 is to be permitted access to the resource server 515. The association 535 may be stored and maintained on the token database 525 when the token 545A is determined to be valid and may be used to apply security policies with respect to the accessing of the resource server 515 by the customer device 505.

In performing the action, the access controller 530 may generate a response 550 to indicate that the end-user associated with the customer device 505 is permitted to access the resource server 515. The response 550 may include an indication that the customer device 505 has been successfully authorized by the authorization server 520 and granted access to the resource server 515. In some embodiments, the response 550 may identify or include the client identifier 540 and the token 545A generated by the authentication gateway 510. In some embodiments, the response 550 may exclude or lack the token 545B generated at the authorization server 520, as the token 545B is maintained and used internally. In some embodiments, the access controller 530 may generate the response 550 to also include or identify information. The information may include information from an initial assertion request of the authentication gateway 510, such as the request identifier for the assertion request. The information may also include a time stamp identifying a time at which the customer device 505 is authorized by the authorization server 520 to access the resource server 515.

Upon generation, the access controller 530 sends or transmits the response 550 to the resource server 515. In some embodiments, the response 550 may be transmitted by the access controller 530 to the resource server 515 (e.g., as depicted) and then may be redirected to the authentication gateway 510. In some embodiments, the response 550 may be transmitted to the authentication gateway 510 directly from the access controller 530. In some embodiments, the access controller 530 may send the response 550 by invoking an interface (e.g., API) of the authorization server 520. The interface may define communications (including the response 550) between the authentication gateway 510 and the authorization server 520. In some embodiments, the invocation of the interface may correspond to a response to an identity assertion request.

The resource server 515 identifies or receives the response 550 from the authorization server 520. Upon receipt, the resource server 515 may parse the response 550 to extract or identify the indication that the end-user associated with the customer device 505 is permitted to access the resource server 515. In some embodiments, the resource server 515 may determine or identify that the end-user associated with the customer device 505 is permitted access based on the receipt of the response 550 from the authorization server 520. Upon the identification, the resource server 515 may grant the end-user associated with the customer device 505 access to the resources hosted and maintained by the resource server 515. In granting the access, the resource server 515 may initiate and establish a session 555 between the authentication gateway 510 and the authorization server 520 (on behalf of the end-user associated with the customer device 505 and the resource server 515). In some embodiments, the session 555 may be established between the customer device 505 and the resource server 515 through the authentication gateway 510. With the establishment of the session 555, the end-user from that customer device 505 may access the resource server 515.

Figure 6:
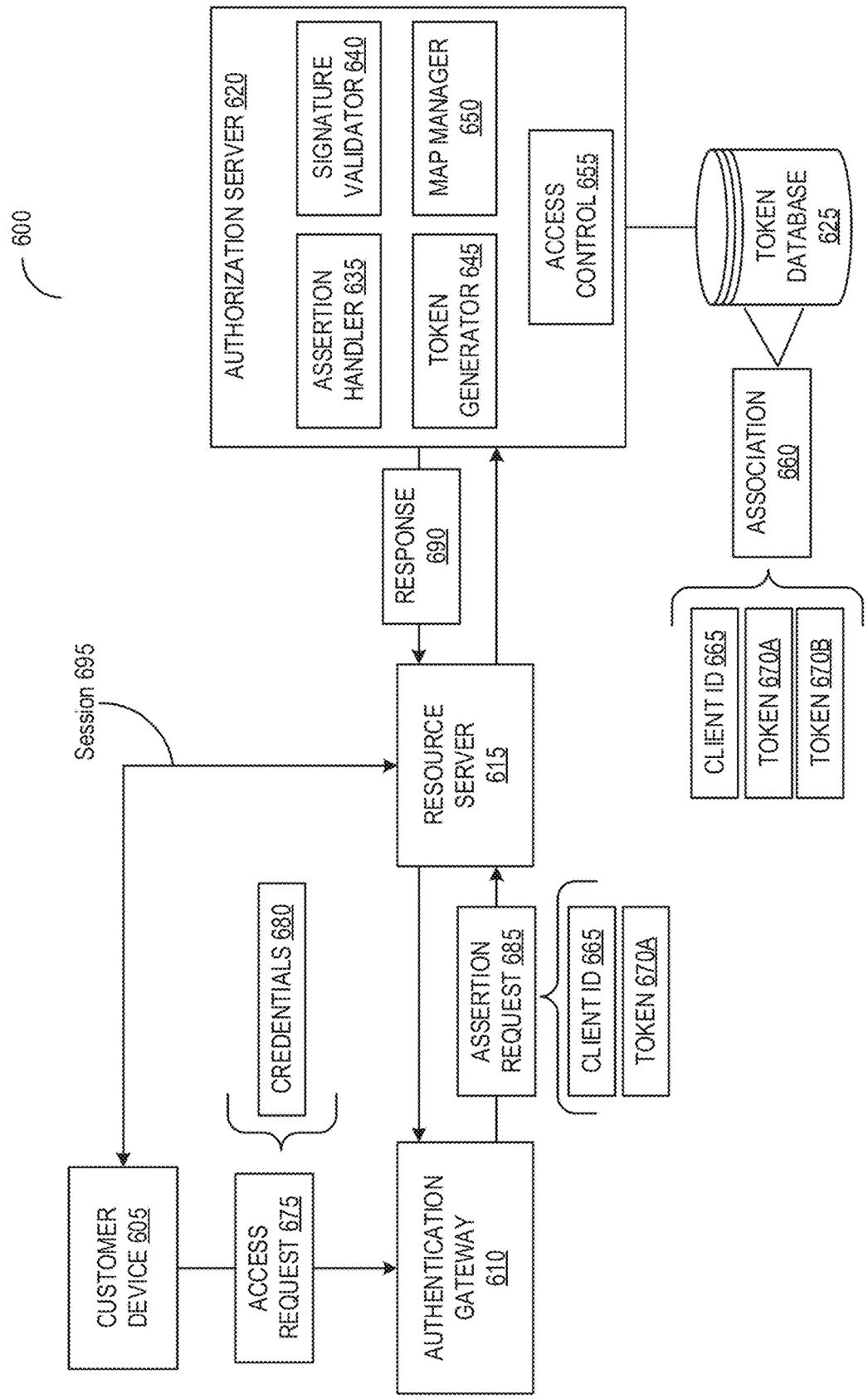
FIG. 6 illustrates a block diagram of an example system for handling subsequent requests in accordance with an illustrative embodiment.

FIG. 6 depicts a block diagram of a system 600 for handling subsequent requests. The system 600 may include a customer device 605 (sometimes also referred herein as a resource requester), an authentication gateway 610 (sometimes also referred herein as an identity provider or an authentication system), a resource server 615, an authorization server 620 (sometimes also referred herein as an authorization system), and a token database 625, among others. The authorization server 620 may include an assertion handler 635, a signature validator 640, a token generator 645, a map manager 650, and an access controller 655, among others. Embodiments may comprise additional or alternative components or omit certain components from those of FIG. 6 and still fall within the scope of this disclosure. Various hardware and software components of one or more public or private networks may interconnect the various components of the system 600. Each component in system 600 (such as the customer device 605, the authentication gateway 610, the resource server 615, the authorization server 620, and the token database 625) may be any computing device comprising one or more processors coupled with memory and software, and capable of performing the various processes and tasks described herein.

After an initial authorization and authentication, the customer device 605 may send or transmit a subsequent access request 675 to the authentication gateway 610. The access request 675 may include credentials 680 (e.g., customer identifier and an authentication factor). The access request 675 may be to again permit the customer device 605 to access the resource server 615. The user of the customer device 605 may have previously been authenticated by the authentication gateway 610 and authorized by the authorization server 620 to access a resource of the resource server 615. For example, the user of the customer device 605 may have accessed a check account balance maintained by the resource server 615. Subsequently, to access another function (e.g., withdrawal) of the resource server 615 sometime thereafter, the customer device 605 may submit another access request 675 to the authentication gateway 610.

The authentication gateway 610 identifies or receives the access request 675 sent from the customer device 605. When the credentials 680 of the access request 675 match the credentials maintained by the authentication gateway 610, the authentication gateway 610 may authenticate the customer device 605. Upon authenticating the customer device 605, the authentication gateway 610 may generate an assertion request 685 to send to the resource server 615. The assertion request 685 may include or identify a client identifier 665 corresponding to the customer device 605 and a token 670A indicating that the customer device 605 is authenticated at the authentication gateway 610. The resource server 615 in turn may receive the assertion request 685 and forward the assertion request 685 on to the authorization server 620.

In some embodiments, to send the assertion request 685, the authentication gateway 610 may invoke an interface (e.g., an application programming interface) defined by the authorization server 620 for an identity assertion request. In some embodiments, the interface may be invoked each time the authentication gateway 610 is to transmit the assertion request 685 via the resource server 615. In this manner, the authorization server 620 may be able to control access every time the customer device 605 attempts to access the resource server 615 via the authentication gateway 610. The ability by the authorization server 620 to control access to the resource server 615 may improve the overall security and integrity of the system 600.

The assertion handler 635 retrieves, identifies, or receives the assertion request 685 from the authentication gateway 610 via the resource server 615. In some embodiments, the assertion handler 635 may identify the authentication gateway 610 from which the assertion request 685 is received. Upon identification, the assertion handler 635 may identify or determine whether the authentication gateway 610 is one of a trusted list of authentication gateways. The assertion request 685 may be derived from a subsequent access request 675. As a result, the assertion handler 635 may determine that authentication gateway 610 is on the trusted list and may continue to proceed to process the assertion request 685. In addition, the assertion handler 635 may parse the assertion request 685 to extract or identify the contents therein, such as the client identifier 665 and the token 670A.

The signature validator 640 validates the token 670A of the assertion request 685. The validation may be in response to identifying the authentication gateway 610 is on the trusted list of authentication gateways. In validating, the signature validator 640 may use a validation key (e.g., a public key in asymmetric encryption) sent by the authentication gateway 610 to determine whether token 670A is valid. The signature validator 640 may extract or identify at least a portion from the contents (e.g., a nonce or the client identifier 665) of the assertion request 685. The portion may correspond to the portion that was used to generate the token 670A at the authentication gateway 610. Upon identification, the signature validator 640 may apply decryption to the token 670A using the validation key to generate a resultant. With the identification, the signature validator 640 may compare the resultant from the decryption of the token 670A versus the portion from the assertion request 685.

When there is no match, the signature validator 640 may determine that the token 670A is invalid and may terminate further processing. The signature validator 640 may also terminate further processing (e.g., generation of an internal token at the authorization server 620) of the assertion handler 635 at the authorization server 620. In terminating, the assertion handler 635 may restrict access of the customer device 305 to the resource server 315. In some embodiments, the assertion handler 635 may send or transmit an indication of failure to authenticate to the customer device 305, the authentication gateway 610, or the resource server 615. On the other hand, when there is a match between the resultant and the portion, the signature validator 640 may determine that the token 670A is valid. The signature validator 640 may also allow for further processing of the assertion handler 325 at the authorization server 620.

The token generator 645 determines whether to generate a token 670B in response to successful validation of the token 670A from the assertion request 685. To determine, the token generator 645 may access the token database 625 using the token 670A to identify the whether the token 670A is associated with a previously generated token. Even if the customer device 605 was previously authenticated and authorized, the token 670A of the current assertion request 685 may be different from the token that was previously used. Furthermore, the token 670B previously generated for the customer device 605 may no longer be alive or removed from the token database 625. When the token 670A does not exist on the token database 625, the token generator 645 may determine that the token 670A differs from the previous token provided by the authentication gateway 610 and may determine to generate the token 670B. In contrast, when the token 670A exists on the token database 625, the token generator 645 may identify whether the token 670B has been removed or disable on the token database 625. The token 670B previously generated by the authorization server 620 may have been subsequently removed or disabled in accordance with a token management policy. If the token 670B has been removed or disabled, the token generator 645 may determine to generate a new token 670B for the token 670A. Otherwise, if the token 670B is determined to be still alive or enabled, the token generator 645 may determine to not generate the token 670B.

When the determination is to generate the token 670B, the token generator 645 may proceed to generate the token 670B. The token 670B may also indicate the customer device 605 is authorized to access the resource server. The token 670B may be used to authorize the end-user associated with the customer device 605 identified by the client identifier 665 at the end-user associated with the authorization server 620 for access to the resource server 615. To generate the token 670B, the token generator 645 may identify at least a portion of content (e.g., a nonce or the client identifier 665) in the assertion request 425. The portion identified for the generation of the token 670B may differ from the portion identified for the generation of the token 670A. With the identification, the token generator 645 may encrypt the identified portion to generate the token 670B. The encryption may include, for example, an asymmetric cryptography, symmetric cryptography, or a cipher, among other. In some embodiments, the encryption applied by the token generation 645 to generate the token 670B may differ from the encryption applied in generating the token 670A.

The map manager 650 may generate or determine an association 660. When the token 670B is newly generated for the client identifier 665 or the token 670A, the map manager 650 may determine a new association 660 for the token 670B. The association 660 may include or identify the client identifier 430, the token 670A from the assertion request 685, and the token 435B generated at the authorization server 620. In some embodiments, in determining the association 660, the map manager 650 may identify the token 670B generated at the authorization server 620 as associated with the token 670A from the assertion request 685. The map manager 650 may further identify the client identifier 665 as associated with the token 435B from the assertion request 425. Using the identifications of the client identifier 430, the token 670A, and the token 435B, the map manager 650 may determine the association 660. The map manager 650 may store and maintain the association 660 on the token database 625.

The map manager 650 may identify the association 660 maintained on the token database 625 using the client identifier 665, the token 670A, or the token 670B, or any combination thereof. The identification of the association 660 may be in response to the validation of the token 670A of the assertion request 685 from the authentication gateway 610. In some embodiments, by accessing the token database 625 using the client identifier 665, the map manager 650 may find or identify the association 660 that includes the client identifier 665 on the token database 625. In some embodiments, the map manager 650 may use the token 670A to find or identify the association 660 that includes the token 670A from the token database 625. In some embodiments, the map manager 650 may use the token 670A to find or identify the association 660 that includes the token 670A from the token database 625. In some embodiments, the map manager 650 may use the token 670B to find or identify the association 660 that includes the token 670B from the token database 625.

With the identification, the map manager 650 may identify whether the token 670A from the assertion request 685 is associated with the token 670B generated at the authorization server 620 in accordance with the association 660. When the association 660 identifies both the token 670A and the token 670B, the map manager 650 may identify that the token 670A is associated with the token 670B. Conversely, when the association 660 does not identify both the token 670A and the token 670B or no association 660 is found, the map manager 650 may identify that the token 670A is not associated with the token 670B. In some embodiments, when the association 660 is newly generated using the token 670B, the map manager 650 may identify the token 670A is associated with the new token 670B. The identification of the association may be without accessing the token database 625.

The access controller 655 performs an action based on the identification of the association 660 or whether the token 670A is associated with the token 670B of any association 660. In performing the action, the access controller 655 may send or transmit a response 690 to the authentication gateway 610 via the resource server 615 or to the resource server 615. In response, the access controller 655 may send the response 690 by invoking an interface (e.g., API) of the authorization server 620. When the token 670A is identified as associated with the token 670B in accordance with the association 660, the access controller 655 may determine to permit the customer device 605 to access the resource server 615. In addition, the access controller 655 may perform the action to permit the customer device 605 to access the resource server 615. The access controller 655 may transmit the response 690 to indicate that the customer device 605 is permitted to access the resource server 615. In contrast, when the token 670A is identified as not associated with the token 670B (or no association 660 is identified), the access controller 655 may determine to restrict the customer device 605 from accessing the resource server 615. In addition, the access controller 655 may perform the action to restrict the customer device 605 from accessing the resource server 615. The access controller 655 may transmit the response 690 to indicate that the customer device 605 is restricted from accessing the resource server 615.

The resource server 615 identifies or receives the response 690 from the authorization server 620. Upon receipt, the resource server 615 may parse the response 690 to extract or identify the indication. When the indication of the response 690 identifies that the customer device 605 is permitted to access the resource server 615, the resource server 615 may grant access to the customer device 605. In granting accessing, the resource server 615 may initiate and establish a session 695 between the authentication gateway 610 and the authorization server 620 (on behalf of the customer device 605 and the resource server 615). In some embodiments, the resource server 615 may continue granting of access to the resource server 615 to the end-user associated with the customer device 605 (via the authentication gateway 610 and the authorization server 620) that was previously authenticated and authorized. With the establishment of the session 695, the customer device 605 may access the resource server 615. Otherwise, when the indication of the response 690 identifies that the end-user associated with the customer device 605 is restricted from access the resource server 615, the resource server 615 may restrict the customer device 605 from accessing the resource server 615. The resource server 615 may also terminate or not establish the session 695 between the customer device 605 and the resource server 615. The customer device 605 may be restricted from accessing the resource server 615.

In this manner, the authorization server 620 may enable the system administrator of the resource server 615 to enforce additional security policies separate from the authentication policies of the authentication gateway 610. The security policies may be enforced on the accessing of the resource server 615 even without the control of the authentication gateway 610. In addition, the system administrator of the resource server 615 may no longer have to wholly rely on the authentication gateway 610 for the proper authentication of customer devices 605 in accessing the resource server 615. Furthermore, the likelihood of improper, unauthorized access of the resource server 615 may be reduced, thereby improving the overall security of the system 600.

Figure 7:
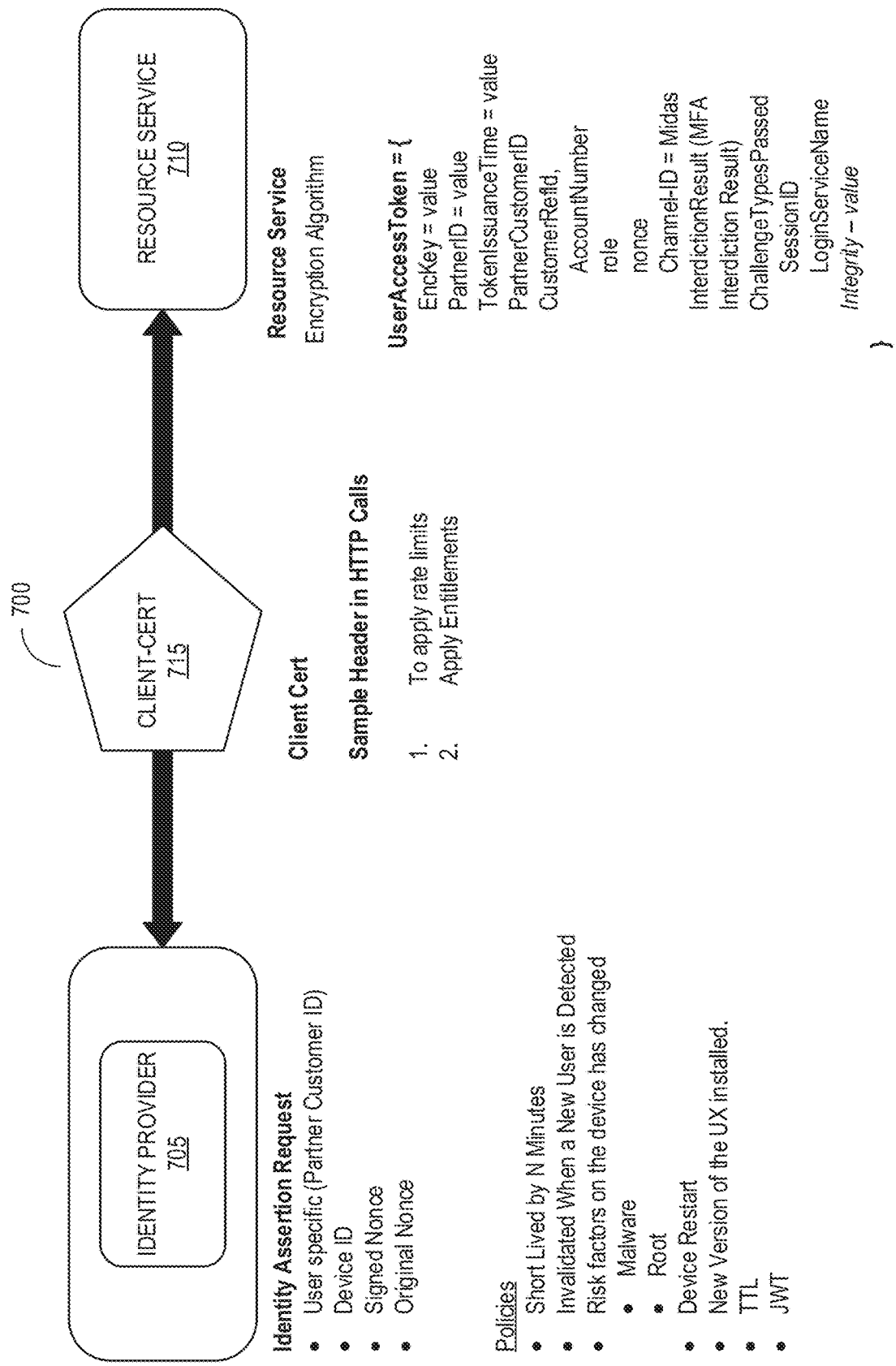
FIG. 7 illustrates a block diagram of an example environment identifying associations among different entities in the system for processing tokens in accordance with an illustrative embodiment.

FIG. 7 depicts a block diagram of an environment 700 among different entities in the system for processing tokens. The environment 700 may include or identify a relationship between an identity provider 705 and a resource service 710. The identity provider 705 may exchange a client certificate 715 with the resource service 710. An identity assertion request from the identity provider 705 may include or identify a user specific identifier (e.g., partner customer identifier), a device identifier, a signed nonce, and an original nonce, among others. The policies applied to the identity assertion request may include or identify a short lived n minutes, an invalidation of when new user is detected, risk factors on device (e.g., malware or root), a device restart, a new version of user interface install, time-to-live (TTL), a JavaScript Object Notation (JSON) web token (JWT) to indicate origin, among others. The client certificate 715 may have a header in a HyperText Transfer Protocol (HTTP) call. The header may be used to apply rate limits and apply entitlements. The user access token of the resource service 710 may include a number of parameters, such as an encryption key value, a partner identifier, a token issuance time, a partner-customer identifier, a customer reference identifier, a customer-company identifier (e.g., an account number, an identity assertion request, nonce, and channel identifier, among others), an interdiction result, a challenge type, and integrity value, among others.

Figure 8:
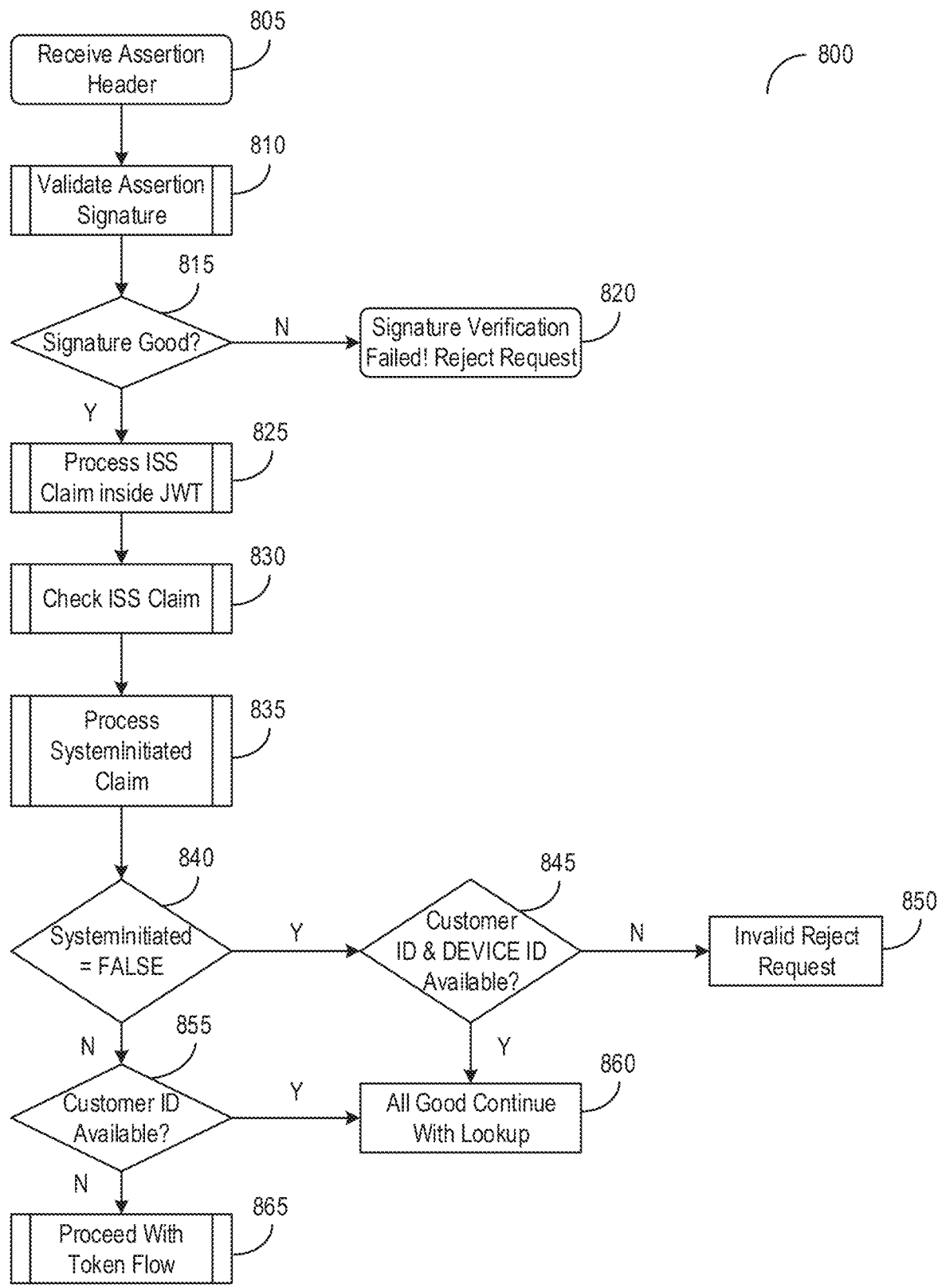
FIG. 8 illustrates a flow diagram of an example method of processing tokens in identity assertions in accordance with an illustrative embodiment.

FIG. 8 depicts a flow diagram of a method 800 of processing tokens in identity assertions. Embodiments may include additional, fewer, or different operations from those described in the method 800. The method 800 may be performed by a server executing machine-readable software code, though it should be appreciated that the various operations may be performed by one or more computing devices and/or processors. At step 805, the server receives an assertion header. At step 810, the server validates an assertion signature. At step 815, the server determines whether the signature is valid. At step 820, if the signature is not valid, the server may reject the assertion containing the signature. At step 825, if the signature is valid, the server may process the Issuer Claim (ISS) in the JavaScript Object Notation (JSON) web token (JWT). At step 830, the server may check the ISS Claim to determine whether the identity provider is approved. At step 835, if the identity provider is approved, the server may process a system-initiated claim. At step 840, the server may determine whether claim is the system-initiated. At step 850, if the system-initiated is determined to be false, the server may determine whether the device identifier is available. At step 850, if the identifier is determined to be unavailable, the server may reject the request. At step 855, if the system-initiated is determined to be true, the system may determine whether the identifier is available. At step 860, if the system-initiated is determined to be true or the device identifier is determined to be available, the server may continue processing with look up. At step 865, if the identifier is determined to be unavailable, the server may proceed with the token flow.

Figure 9A:
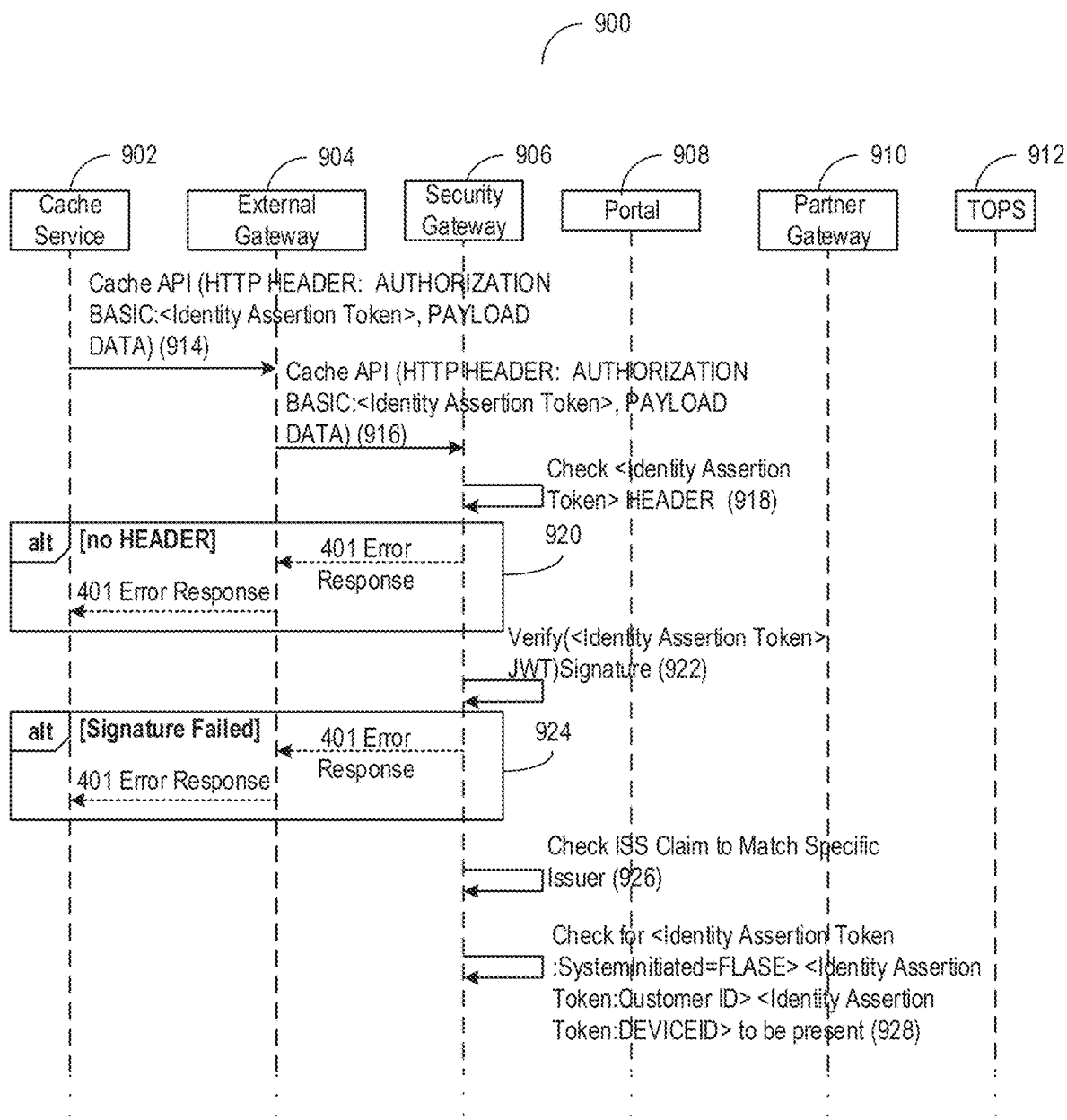
FIGS. 9A-C illustrate communication diagrams of an example process for a token issuance in accordance with an illustrative embodiment.
Figure 9B:
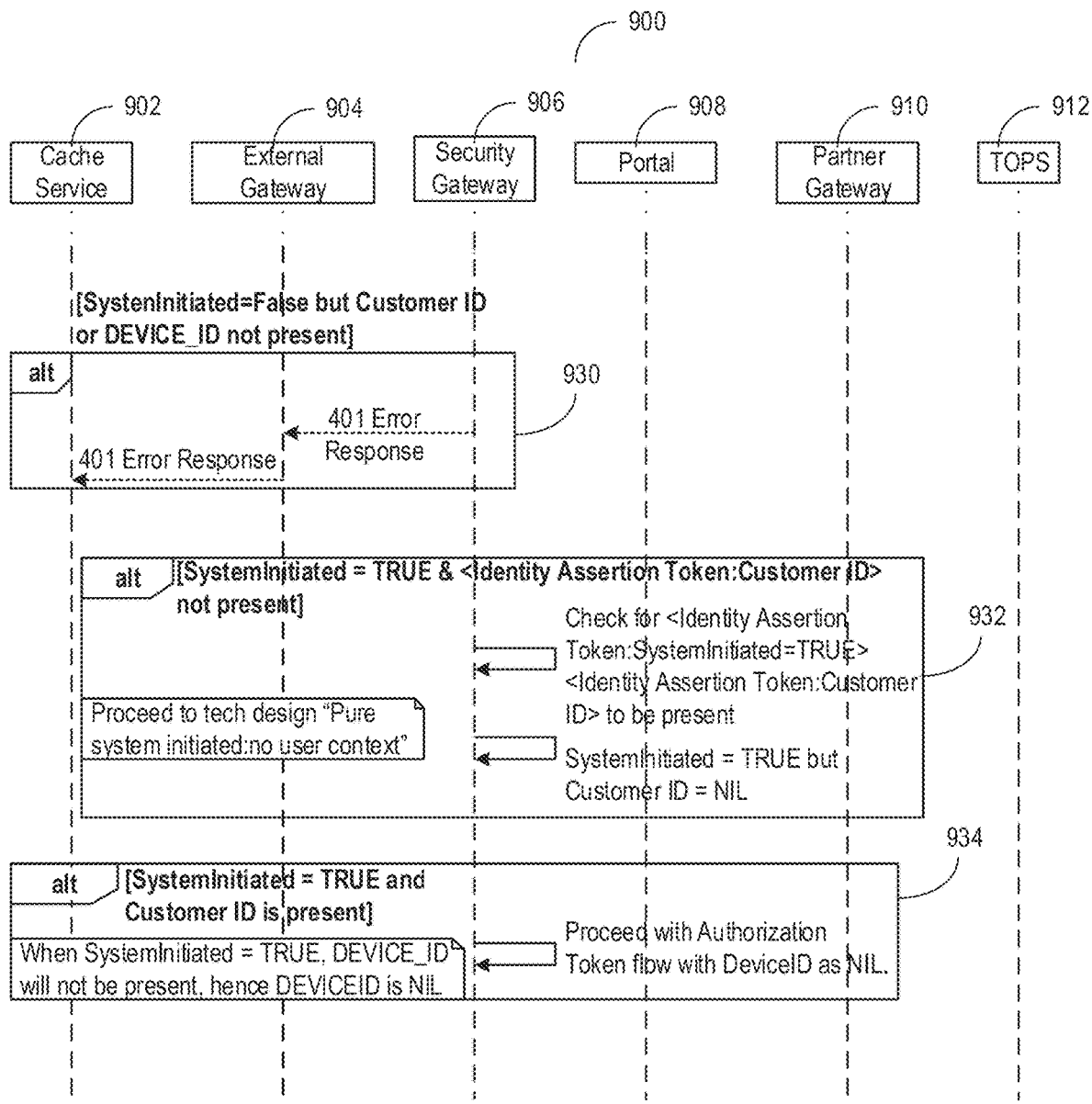
Figure 9C:
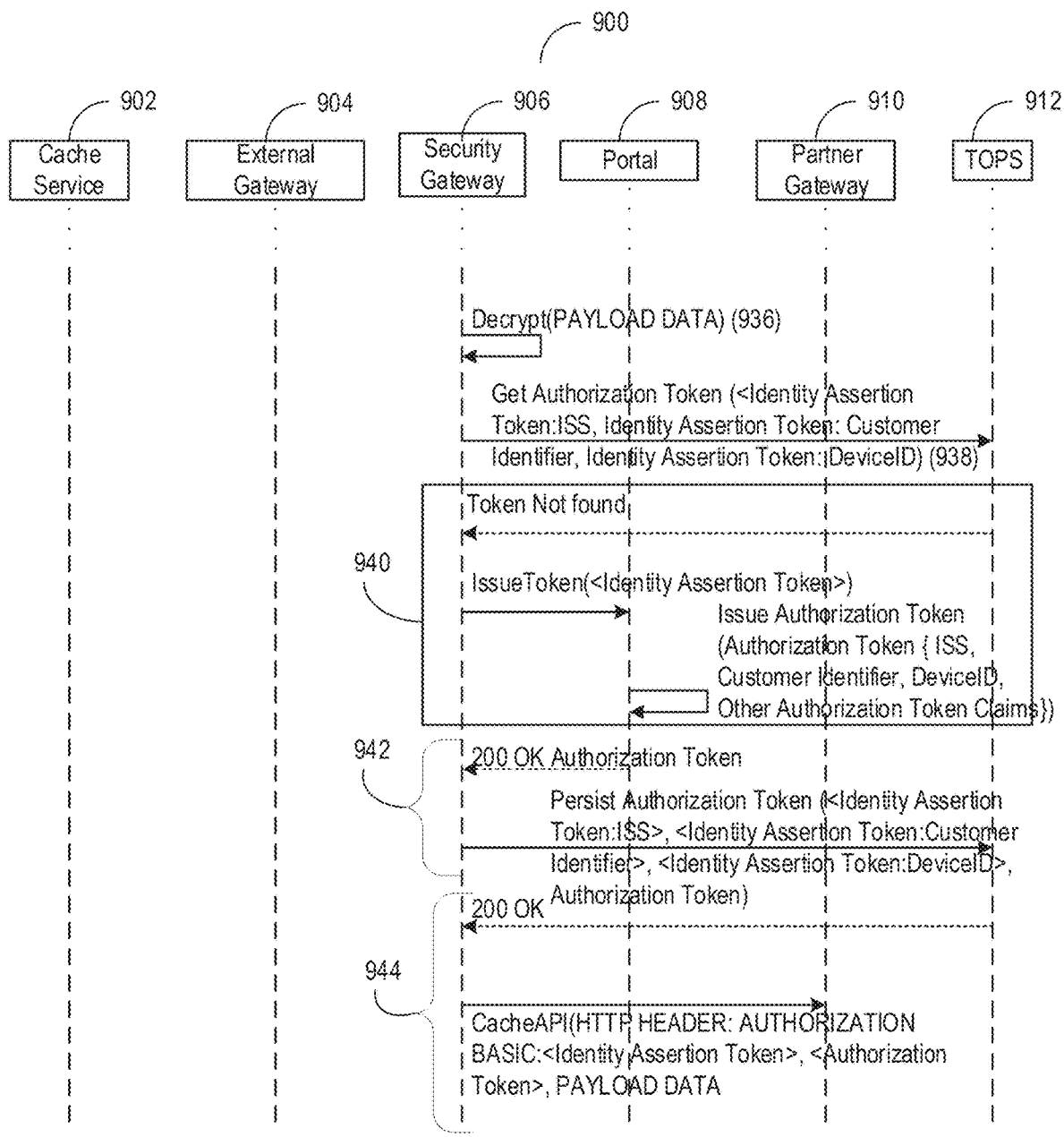

FIGS. 9A-C depict communication diagrams of a process 900 for a token issuance. Embodiments may include additional, fewer, or different operations from those described in the process 900. The process 900 may be performed by a number of devices executing machine-readable software code, though it should be appreciated that the various operations may be performed by one or more computing devices and/or processors. The devices performing the process 900 may include a cache server 902, an external gateway 904, a security gateway 906, a portal 908, a partner gateway 910, and token persistence database (TOPS) 912, among others.

At step 914, the cache service 902 may transmit a cache interface call to the external gateway 904. At step 916, the external gateway 904 may forward the cache interface call to the security gateway 906. At step 918, the security gateway 906 may check the header of the cache interface call. At step 920, if there is no header, the PSG 906 may send an error response to the external gateway 904 and the external gateway 904 may forward the error response to the cache server 902. At step 922, the security gateway 906 may verify the signature. At step 924, if the signature is invalid, the security gateway 906 may send an error response to the external gateway 904 and the external gateway 904 may forward the error response to the cache server 902. At step 926, the PSG may check the identity provider to match. At step 928, the security gateway may check whether a device identifier is present.

At step 930, if system-initiated is false or the device identifier is not present, the security gateway 906 may send an error response to the external gateway 904 and the external gateway 904 may forward the error response to the cache server 902. At step 932, if the system-initiated is true and the identifier is not present, the security gateway 906 may check the identifier to be present. At step 934, if the system-initiated is true and the identifier is present, the security gateway 906 may proceed with flow with device identifier. At step 936, the security gateway 906 may decrypt the payload data of the cache interface call. At step 938, the security gateway 906 may send a request to retrieve a token to the TOPS 912. At step 940, the TOPS 912 may return a token not found indicator, and in turn the security gateway 906 may issue a token to the portal 908, and the portal 908 may issue the token. At step 942, the portal 908 may return an indicator to the security gateway 906 and the security gateway 906 in turn may store the token on the TOPS 912. At step 944, the TOPS 912 may return a response and forward the cache interface call to the partner gateway 910.

Figure 10:
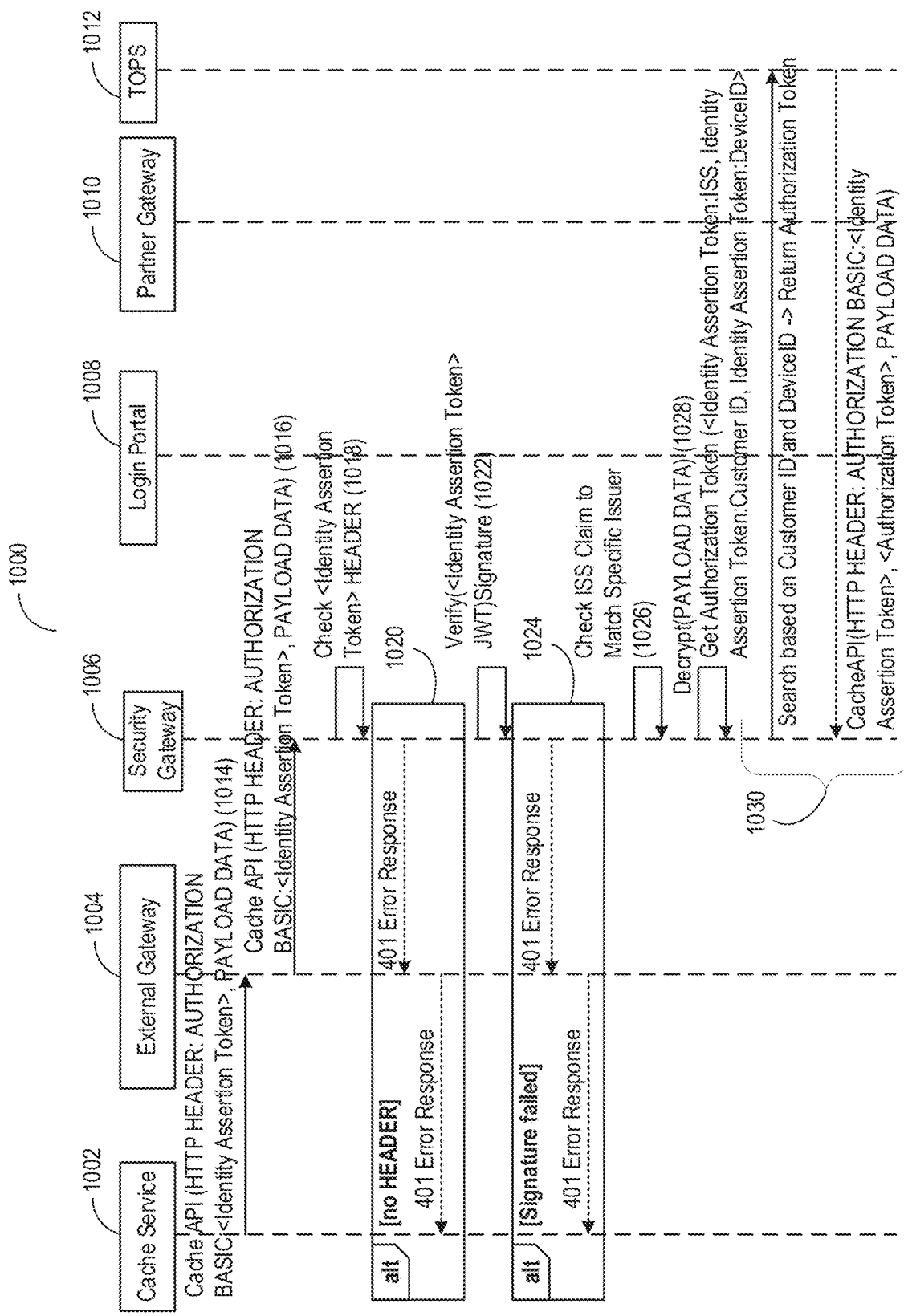
FIG. 10 illustrate a communication diagram of an example process for a token retrieval in accordance with an illustrative embodiment.

FIG. 10 depicts a communication diagram of a process 1000 for a token retrieval. Embodiments may include additional, fewer, or different operations from those described in the process 1000. The process 1000 may be performed by a number of devices executing machine-readable software code, though it should be appreciated that the various operations may be performed by one or more computing devices and/or processors. The devices performing the process 1000 may include a cache server 1002, an external gateway 1004, a security gateway 1006, a portal 1008, a partner gateway 1010, and token persistence database (TOPS) 1012, among others.

At step 1014, the cache server 1002 may transmit a cache interface call to the external gateway 1004. At step 1016, the external gateway 1004 may forward the cache interface call to the security gateway 1006. At step 1018, the security gateway 1006 may check the header of the cache interface call. At step 1020, if there is no header, the security gateway 1006 may send an error response to the external gateway 1004 and the external gateway 1004 may forward the error response to the cache server 1002. At step 1022, the security gateway 1006 may verify the signature. At step 1024, if the signature is invalid, the security gateway 1006 may send an error response to the external gateway 1004, and the external gateway 1004 may forward the error response to the cache server 1002. At step 1026, the security gateway may check the identity provider to match. At step 1028, the security gateway 1006 may decrypt the payload data. At step 1030, the security gateway 1006 may retrieve the token and process the cache interface call using the retrieved token.

Figure 11:
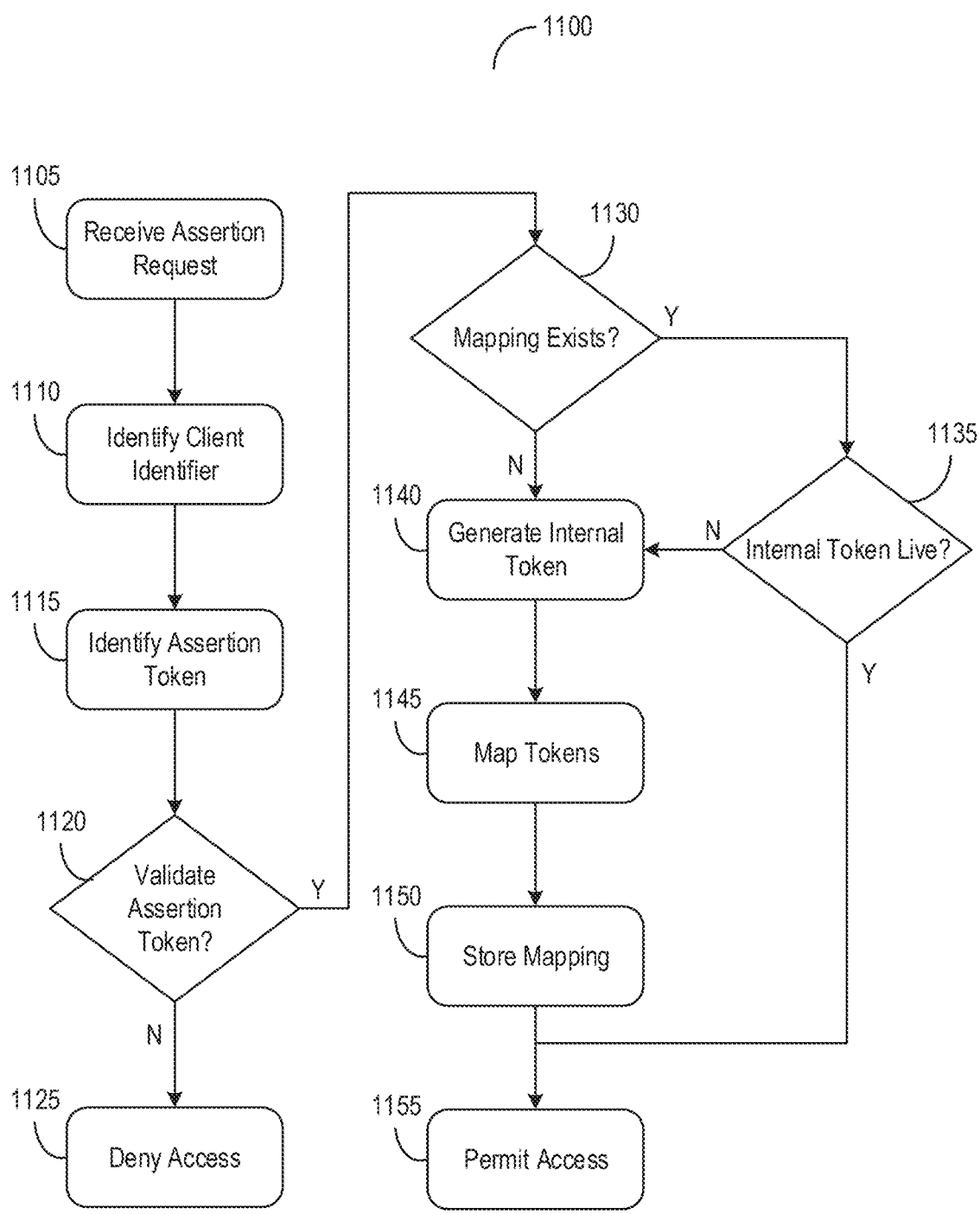
FIG. 11 illustrates a flow diagram of an example method of processing tokens in identity assertions for access control to resources in accordance with an illustrative embodiment.

FIG. 11 depicts a flow diagram of a method 1100 of processing tokens in identity assertions for access control to resources. Embodiments may include additional, fewer, or different operations from those described in the method 1100. The method 1100 may be performed by a server executing machine-readable software code, though it should be appreciated that the various operations may be performed by one or more computing devices and/or processors.

At step 1105, a server receives an assertion request. A customer device may have sent an access request containing credentials to an authentication gateway. The authentication gateway may authenticate the customer device using the credentials. Upon successful authentication, the authentication gateway may generate an assertion request to indicate that the customer device was authenticated at the authentication gateway. The assertion request may include an identity assertion token generated using an encryption key. With the generation, the authentication gateway may send the authentication request to the authentication gateway.

At step 1110, the server identifies a client identifier. The server may parse the assertion request to identify the client identifier. The client identifier may correspond to the customer device attempting to access a resource of a service. At step 1115, the server identifies an assertion token. The server may also parse the assertion request from the authentication gateway to identify the assertion token therein. The authentication token may indicate that the customer device was successfully authenticated at the authentication gateway.

At step 1120, the server determines whether the assertion token is valid. The server may have received an encryption key from the authentication gateway out-of-band. Upon identifying the token, the server may identify a nonce from the assertion request. The nonce may have been used to generate the assertion token. The server may apply the encryption key to the nonce to generate a resultant. When the resultant matches the assertion token, the server may determine the assertion token is valid. Otherwise, when the resultant does not match the assertion token, the server may determine that the assertion token is not valid. At step 1125, if the assertion token is determined as invalid, the server denies access. The server may respond with an indication of failure to authorize.

At step 1130, if the assertion token is determined as valid, the server determines whether a mapping exists. Using the client identifier, the server may access a token database to identify a corresponding mapping. The token database may maintain a set of previously constructed mappings. Each mapping may identify a client identifier, an identity assertion token, and an internal token.

At step 1135, if the mapping is determined to exist, the server determines whether an internal token is alive. The internal token may indicate that the identity assertion token is valid and that the customer device is authenticated at the server. The mappings and the token in each mapping on the token database may be maintained in accordance with a token management policy. When the internal token is to be disabled based on the specifications of the policy, the server may determine that internal token is not alive. Otherwise, when the internal token is to be maintained based on the specifications of the policy, the server may maintain the internal token.

At step 1140, if no mapping exists or the internal token is not alive, the server generates an internal token. The internal token may indicate that the customer device is successfully authorized at the server. In generating, the server may identify a nonce from the assertion request. With the identification, the server may apply an encryption on the nonce to generate the internal token. At step 1145, the server maps the internal token with the assertion token. Upon generation of the internal token, the server may determine a mapping identifying the client identifier, the assertion token, and the internal token. At step 1150, the server stores the mapping. The server may maintain the mapping on the database. The mapping may be maintained or removed in accordance with a policy. At step 1115, the server permits the access. The server may send a response to indicate that the customer device is permitted access.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:
   receiving, by a server via a gateway from a customer device, a first request to access to a resource, the first request including an identifier of the customer device and a first token used by the gateway to authenticate the customer device;
   validating, by the server, the first token based on identifying the gateway as corresponding to one of a plurality of gateways trusted with authentication on behalf of the server, the gateway configured to generate the first token responsive to authentication of the customer device;
   creating, by the server responsive to validating the first token, a second token to be used to authorize the customer device to access the resource;
   generating, by the server, an association identifying the identifier of the customer device, the first token, and the second token, wherein the association is configured to provide the customer device access to the resource by permitting a second request from the customer device subsequent to the first request;
   transmitting, by the server to the gateway, a response to provide the customer device access to the resource in accordance with the association;
   applying, by the server, a policy identifying a plurality of conditions to determine whether the association is to be maintained or revoked;
   determining, by the server, that the association satisfies a condition of the plurality of conditions to revoke; and
   disabling, by the server, the association restrict the customer device from accessing the resource, responsive to determining that the association satisfies the condition to revoke.

2. The method of claim 1, further comprising determining, by the server, that the customer device is to be permitted access to the resource in response to generating the association, and
   wherein transmitting the response further comprises transmitting the response to permit the customer device access, responsive to determining that the customer device is to be permitted access.

3. The method of claim 1, further comprising:
   receiving, by the server, subsequent to generating the association, the second request to access the resource, the second request including the identifier and a third token used by the gateway to authenticate the customer device; and
   determining, by the server, that the customer device is to be permitted access to the resource, responsive to an existence of the association identifying the identifier, the third token corresponding to the first token, and the second token,
   wherein transmitting the response further comprises transmitting the response to permit the customer device access, responsive to determining that the customer device is to be permitted access.

4. The method of claim 1, further comprising:
   receiving, by the server, subsequent to generating the association, the second request to access the resource, the second request including the identifier and a third token used by the gateway to authenticate the customer device; and
   determining, by the server, that the customer device is to be restricted from access to the resource, responsive to lack of any associations identifying at least one of the identifier or the third token,
   wherein transmitting the response further comprises transmitting the response to restrict the customer device access, responsive to determining that the customer device is to be restricted from access.

5. The method of claim 1, further comprising:
   identifying, by the server, the association identifying the identifier, the first token corresponding to a third token of the second request to access the resource, and the second token, as disabled; and
   determining, by the server, that the customer device is to be restricted from access to the resource, responsive to identifying the association as disabled,
   wherein transmitting the response further comprises transmitting the response to restrict the customer device access, responsive to determining that the customer device is to be restricted from access.

6. The method of claim 1, further comprising:
   receiving, by the server, the second request to access the resource, a second request including the identifier and a third token used by the gateway to authenticate the customer device;
   determining, by the server, responsive to failure to validate the third token, that the customer device is to be restricted from accessing the resource, and
   transmitting, by the server to the gateway, an indication of a failure to validate the third token in the second request.

7. The method of claim 1, further comprising:
   determining, by the server, that a second association satisfies a second condition to maintain; and
   maintaining, by the server, the second association to continue to permit the customer device to access the resource, responsive to determining that the second association satisfies the second condition to maintain.

8. The method of claim 1, further comprising:
   identifying, by the server, the gateway from which the request is received as corresponding to one of the plurality of gateways trusted with authentication on behalf of the server.

9. The method of claim 1, further comprising performing, by the server, an action to permit or restrict the customer device from accessing the resource, in accordance with the association.

10. A system, comprising:
    a server having one or more processors coupled with memory, configured to:
        receive, via a gateway from a customer device, a request to access to a resource, the request including an identifier of the customer device and a first token used by the gateway to authenticate the customer device;
        validate the first token based on identifying the gateway as corresponding to one of a plurality of gateways trusted with authentication on behalf of the server, the gateway configured to generate the first token responsive to authentication of the customer device;

create, responsive to validating the first token, a second token to be used to authorize the customer device to access the resource;

generate an association identifying the identifier of the customer device, the first token, and the second token, wherein the association is configured to provide the customer device access to the resource by permitting a second request from the customer device subsequent to the first request;

transmit, to the gateway, a response to provide the customer device access to the resource in accordance with the association;

apply a policy identifying a plurality of conditions to determine whether the association is to be maintained or revoked;

determine that the association satisfies a condition of the plurality of conditions to revoke; and disable the association restrict the customer device from accessing the resource, responsive to determining that the association satisfies the condition to revoke.

11. The system of claim 10, wherein the server is further configured to:

determine that the customer device is to be permitted access to the resource in response to generating the association, and transmit the response to permit the customer device access, responsive to determining that the customer device is to be permitted access.

12. The system of claim 10, wherein the server is further configured to:

receive, subsequent to generating the association, the second request to access the resource, the second request including the identifier and a third token used by the gateway to authenticate the customer device; and determine that the customer device is to be permitted access to the resource, responsive to an existence of the association identifying the identifier, the third token corresponding to the first token, and the second token, transmit the response to permit the customer device access, responsive to determining that the customer device is to be permitted access.

13. The system of claim 10, wherein the server is further configured to:

receive, subsequent to generating the association, the second request to access the resource, the second request including the identifier and a third token used by the gateway to authenticate the customer device; and determine that the customer device is to be restricted from access to the resource, responsive to lack of any associations identifying at least one of the identifier or the third token, transmit the response to restrict the customer device access, responsive to determining that the customer device is to be restricted from access.

14. The system of claim 10, wherein the server is further configured to:

identify the association identifying the identifier, the first token corresponding to a third token of the second request to access the resource, and the second token, as disabled; and determine that the customer device is to be restricted from access to the resource, responsive to identifying the association as disabled, transmit the response to restrict the customer device access, responsive to determining that the customer device is to be restricted from access.

15. The system of claim 10, wherein the server is further configured to:

receive the second request to access the resource, a second request including the identifier and a third token used by the gateway to authenticate the customer device;

determine, responsive to failure to validate the third token, that the customer device is to be restricted from accessing the resource, and transmit, to the gateway, an indication of a failure to validate the third token in the second request.

16. The system of claim 10, wherein the server is further configured to:

determine that a second association satisfies a second condition to maintain; and maintain the second association to continue to permit the customer device to access the resource, responsive to determining that the second association satisfies the second condition to maintain.

17. The system of claim 10, wherein the server is further configured to:

identify the gateway from which the request is received as corresponding to one of the plurality of gateways trusted with authentication on behalf of the server.

18. The system of claim 10, wherein the server is further configured to perform an action to permit or restrict the customer device from accessing the resource, in accordance with the association.

* * * * *